US008936285B2

(12) United States Patent
Inoue

(10) Patent No.: US 8,936,285 B2
(45) Date of Patent: Jan. 20, 2015

(54) BUMPER STRUCTURE

(75) Inventor: Katsuya Inoue, Nisshin (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/637,567

(22) PCT Filed: Mar. 15, 2011

(86) PCT No.: PCT/JP2011/056076
§ 371 (c)(1),
(2), (4) Date: Sep. 26, 2012

(87) PCT Pub. No.: WO2012/124058
PCT Pub. Date: Sep. 20, 2012

(65) Prior Publication Data
US 2014/0001780 A1 Jan. 2, 2014

(51) Int. Cl.
B60R 19/22 (2006.01)
B60R 19/18 (2006.01)
B60R 19/02 (2006.01)

(52) U.S. Cl.
CPC .............. B60R 19/18 (2013.01); B60R 19/023 (2013.01); B60R 2019/1813 (2013.01); B60R 2019/186 (2013.01)
USPC ........... 293/132; 293/102; 293/120; 293/133; 293/136

(58) Field of Classification Search
CPC ........ B60R 19/04; B60R 19/18; B60R 19/22; B60R 21/34
USPC ......... 293/102, 120, 121, 132, 133, 135, 136, 293/150, 142, 154; 296/187.04
See application file for complete search history.

(56) References Cited

U.S. PATENT DOCUMENTS 3,666,310 A * 5/1972 Burgess et al. ............... 293/109
3,888,531 A * 6/1975 Straza et al. .................. 293/120
(Continued)

FOREIGN PATENT DOCUMENTS

DE 102 60 342 A1 8/2003
JP U-54-71838 5/1979
(Continued)

OTHER PUBLICATIONS

Apr. 26, 2011 International Search Report issued in International Patent Application No. PCT/JP2011/056076.
(Continued)

Primary Examiner — Gregory Blankenship
(74) Attorney, Agent, or Firm — Oliff PLC

(57) ABSTRACT

A bumper structure, that can mitigate impact when a collision body collides with a vehicle transverse direction end portion of an impact absorbing member, is obtained. A bumper structure has a bumper reinforcement that extends along a vehicle transverse direction at a vehicle front-rear direction end portion; an impact absorbing member that is provided at a vehicle front-rear direction outer side of this bumper reinforcement, and at which an outer side surface of a vehicle transverse direction end portion is made to be an inclined surface that is inclined toward a vehicle transverse direction outer side, from a vehicle front-rear direction outer side toward a vehicle front-rear direction inner side; and a plate-shaped member that is provided along the inclined surface, and whose rigidity is higher than the impact absorbing member.

11 Claims, 26 Drawing Sheets

(56) References Cited

U.S. PATENT DOCUMENTS

| | | | |
|---|---|---|---|
| 4,070,052 A * | 1/1978 | Ng | 293/107 |
| 4,509,782 A * | 4/1985 | Manning | 293/121 |
| 4,671,550 A * | 6/1987 | Molnar | 293/120 |
| 5,056,840 A * | 10/1991 | Eipper et al. | 293/120 |
| 5,139,297 A | 8/1992 | Carpenter et al. | |
| 5,711,562 A * | 1/1998 | Terada et al. | 293/120 |
| 6,644,701 B2 * | 11/2003 | Weissenborn et al. | 293/120 |
| 6,733,055 B2 * | 5/2004 | Iino | 293/142 |
| 7,147,258 B2 * | 12/2006 | Evans et al. | 293/120 |
| 7,222,897 B2 * | 5/2007 | Evans et al. | 293/120 |
| 7,810,858 B2 * | 10/2010 | Frederick et al. | 293/120 |
| 7,954,864 B2 * | 6/2011 | Frederick et al. | 293/120 |
| 8,075,029 B2 * | 12/2011 | Takahashi | 293/4 |
| 8,485,574 B2 * | 7/2013 | Harada et al. | 293/120 |
| 8,505,990 B2 * | 8/2013 | Czopek et al. | 293/102 |
| 2009/0108598 A1 | 4/2009 | Takahashi | |
| 2009/0322107 A1 * | 12/2009 | Takahashi et al. | 293/121 |
| 2014/0001780 A1 * | 1/2014 | Inoue | 293/132 |

FOREIGN PATENT DOCUMENTS

| | | |
|---|---|---|
| JP | A-59-182718 | 10/1984 |
| JP | U-61-165251 | 10/1986 |
| JP | A-7-61298 | 3/1995 |
| JP | A-2000-264142 | 9/2000 |
| JP | A-2004-189171 | 7/2004 |
| JP | A-2004-345423 | 12/2004 |
| JP | A-2005-297726 | 10/2005 |
| JP | A-2006-111044 | 4/2006 |
| JP | A-2006-123679 | 5/2006 |
| JP | A-2007-45171 | 2/2007 |
| JP | A-2007-069707 | 3/2007 |
| JP | A-2007-203773 | 8/2007 |
| JP | A-2007-331649 | 12/2007 |
| JP | A-2008-260364 | 10/2008 |
| JP | A-2009-40423 | 2/2009 |

OTHER PUBLICATIONS

Jan. 27, 2014 Extended European Search Report issued in European Patent Application No. 11 860 901.5.

* cited by examiner

BUMPER STRUCTURE

TECHNICAL FIELD

The present invention relates to a bumper structure.

BACKGROUND ART

Following Patent Document 1 discloses a structure in which an energy absorbing member is disposed between a bumper cover and a bumper reinforcement, and that mitigates impact to the leg portion of a pedestrian.
[Patent Document 1] Japanese Patent Application Laid-Open No. 2006-123679

SUMMARY OF INVENTION

Technical Problem

In a case in accordance with aforementioned Patent Document 1, the deformation area is small at the vehicle transverse direction end portions of the energy absorbing member as compared with the vehicle transverse direction central portion. Therefore, it is thought that, at the time of a collision, a collision body will hit the bottom of (abut) the bumper reinforcement via the energy absorbing member without a sufficient load being generated.

In view of the above-described circumstances, an object of the present invention is to obtain a bumper structure that can mitigate the impact when a collision body collides with a vehicle transverse direction end portion of an impact absorbing member.

Solution to Problem

A bumper structure of a first aspect relating to the present invention is a structure having: a bumper reinforcement that extends along a vehicle transverse direction at an end portion in a vehicle front-rear direction; an impact absorbing member that is provided at a vehicle front-rear direction outer side of the bumper reinforcement, and at which an outer side surface of a vehicle transverse direction end portion is made to be an inclined surface that is inclined toward a vehicle transverse direction outer side, from a vehicle front-rear direction outer side toward a vehicle front-rear direction inner side; and a plate-shaped member that is provided along the inclined surface, having higher rigidity than the impact absorbing member.

A bumper structure of a second aspect relating to the present invention is a structure in which, in the bumper structure of the first aspect, the plate-shaped member can separate from the impact absorbing member, accompanying deformation of the impact absorbing member due to input of impact load to a vehicle transverse direction inner side region that includes the vehicle transverse direction end portion of the impact absorbing member.

A bumper structure of a third aspect relating to the present invention is a structure in which, in the bumper structure of the first aspect or the second aspect, a bent portion, that is bent so as to wrap-around toward a vehicle transverse direction inner side of the inclined surface of the impact absorbing member, is provided at a vehicle transverse direction inner side of the plate-shaped member.

A bumper structure of a fourth aspect relating to the present invention is a structure in which, in the bumper structure of any one aspect of the first aspect through the third aspect, a gap in the vehicle front-rear direction is provided between a vehicle transverse direction outer side end portion of the plate-shaped member and the bumper reinforcement.

A bumper structure of a fifth aspect relating to the present invention is a structure in which, in the bumper structure of any one aspect of the second aspect through the fourth aspect, the plate-shaped member is adhered to at least the inclined surface of the impact absorbing member.

A bumper structure of a sixth aspect relating to the present invention is a structure in which, in the bumper structure of any one aspect of the second aspect through the fourth aspect, the plate-shaped member has an engaging portion that is engaged with a portion to be engaged that is provided at the inclined surface.

A bumper structure of a seventh aspect relating to the present invention is a structure in which, in the bumper structure of any one aspect of the second aspect through the fourth aspect, the plate-shaped member is held at the inclined surface by a pair of claws that are provided at both sides of the inclined surface at the impact absorbing member.

A bumper structure of an eighth aspect relating to the present invention is a structure in which, in the bumper structure of any one aspect of the second aspect through the fourth aspect, the plate-shaped member is joined, by integral molding or welding, to at least the inclined surface of the impact absorbing member.

A bumper structure of a ninth aspect relating to the present invention is a structure in which, in the bumper structure of any one aspect of the first aspect through the eighth aspect, the plate-shaped member has, at vehicle vertical direction both end portions, flange portions that are bent at a top surface side and a bottom surface side of the impact absorbing member.

A bumper structure of a tenth aspect relating to the present invention is a structure in which, in the bumper structure of any one aspect of the first aspect through the ninth aspect, the plate-shaped member has a rib that projects-out at the impact absorbing member side, and is mounted by the rib being inserted into the impact absorbing member.

In accordance with the bumper structure of the first aspect relating to the present invention, the impact absorbing member is provided at the vehicle front-rear direction outer side of the bumper reinforcement that extends along the vehicle transverse direction at an end portion in the vehicle front-rear direction. The outer side surface of the vehicle transverse direction end portion at the impact absorbing member is made to be an inclined surface that is inclined toward the vehicle transverse direction outer side, from the vehicle front-rear direction outer side toward the vehicle front-rear direction inner side. The plate-shaped member, that has higher rigidity than the impact absorbing member, is provided along the inclined surface of the impact absorbing member. Due thereto, when a collision body collides with the vehicle transverse direction end portion of the impact absorbing member, the collision body is repelled in the lateral direction (toward the vehicle transverse direction outer side) by the plate-shaped member that is provided at the inclined surface of the impact absorbing member, and the collision body is prevented from hitting the bottom of (abutting) the bumper reinforcement via the impact absorbing member. Further, the impact that the plate-shaped member receives is transmitted to the impact absorbing member at the entire inclined surface, and the initial reaction force can be increased.

In accordance with the bumper structure of the second aspect relating to the present invention, when a collision body collides with a vehicle transverse direction inner side region that includes the vehicle transverse direction end portion of the impact absorbing member, the plate-shaped member separates from the impact absorbing member accompanying the deformation of the impact absorbing member due to the input of impact load. Due thereto, even if the plate-shaped member that has a higher rigidity than the impact absorbing member is provided, effects on the impact mitigation of the impact absorbing member can be lessened.

In accordance with the bumper structure of the third aspect relating to the present invention, by placing the bent portion of the plate-shaped member at the vehicle transverse direction inner side of the inclined surface of the impact absorbing member so as to wrap-around, when a collision body collides with the plate-shaped member of the vehicle transverse direction end portion of the impact absorbing member, the initial reaction force can be increased due to load being transmitted to the impact absorbing member also from the bent portion of the plate-shaped member that wraps-around at the vehicle transverse direction inner side of the inclined surface of the impact absorbing member.

In accordance with the bumper structure of the fourth aspect relating to the present invention, a gap in the vehicle front-rear direction is provided between the vehicle transverse direction outer side end portion of the plate-shaped member and the bumper reinforcement. Due to the gap being crushed when impact is applied to the plate-shaped member, the plate-shaped member moves in the vehicle front-rear direction, and the plate-shaped member moving toward the vehicle transverse direction outer side is suppressed. Due thereto, weakening of the effect of repelling the collision body in the lateral direction (toward the vehicle transverse direction outer side) can be suppressed.

In accordance with the bumper structure of the fifth aspect relating to the present invention, the plate-shaped member is adhered to at least the inclined surface of the impact absorbing member. When a collision body collides with a vehicle transverse direction inner side region that includes the vehicle transverse direction end portion of the impact absorbing member, accompanying the deformation of the impact absorbing member, the adhered portion of the plate-shaped member and the inclined surface of the impact absorbing member peels, and the plate-shaped member can be separated from the impact absorbing member.

In accordance with the bumper structure of the sixth aspect relating to the present invention, the engaging portion of the plate-shaped member is engaged with the portion to be engaged that is provided at the inclined surface of the impact absorbing member. When a collision body collides with a vehicle transverse direction inner side region that includes the vehicle transverse direction end portion of the impact absorbing member, accompanying the deformation of the impact absorbing member, the engagement of the engaging portion of the plate-shaped member and the portion to be engaged of the impact absorbing member comes undone, and the plate-shaped member can be separated from the impact absorbing member.

In accordance with the bumper structure of the seventh aspect relating to the present invention, the plate-shaped member is held at the inclined surface by the pair of claws that are provided at the both sides of the inclined surface at the impact absorbing member. When a collision body collides with a vehicle transverse direction inner side region that includes the vehicle transverse direction end portion of the impact absorbing member, due to a claw breaking or the like accompanying the deformation of the impact absorbing member, the plate-shaped member can be separated from the impact absorbing member.

In accordance with the bumper structure of the eighth aspect relating to the present invention, the plate-shaped member is joined, by integral molding or welding, to at least the inclined surface of the impact absorbing member. When a collision body collides with a vehicle transverse direction inner side region that includes the vehicle transverse direction end portion of the impact absorbing member, due to the joining of the plate-shaped member and the impact absorbing member coming undone accompanying the deformation of the impact absorbing member, the plate-shaped member can be separated from the impact absorbing member.

In accordance with the bumper structure of the ninth aspect relating to the present invention, the plate-shaped member has, at the vehicle vertical direction both end portions, flange portions that are bent at the top surface side and the bottom surface side of the impact absorbing member, and the rigidity of the plate-shaped member can be ensured.

In accordance with the bumper structure of the tenth aspect relating to the present invention, the plate-shaped member has a rib that projects-out at the impact absorbing member side, and the plate-shaped member is mounted to the impact absorbing member due to the rib being inserted-in the impact absorbing member. The rigidity of the plate-shaped member can be ensured by the rib, and the mounting of the plate-shaped member to the impact absorbing member is easy.

Advantageous Effects of Invention

In accordance with the bumper structure relating to the present invention, impact can be mitigated when a collision body collides with a vehicle transverse direction end portion of an impact absorbing member.

BEST MODES FOR CARRYING OUT THE INVENTION

A first embodiment of a bumper structure relating to the present invention is described hereinafter by using FIG. 1 through FIG. 6. Note that arrow FR, that is shown appropriately in these drawings, indicates the vehicle front side, arrow UP indicates the vehicle upper side, and arrow OUT indicates the vehicle transverse direction outer side.

Figure 1:
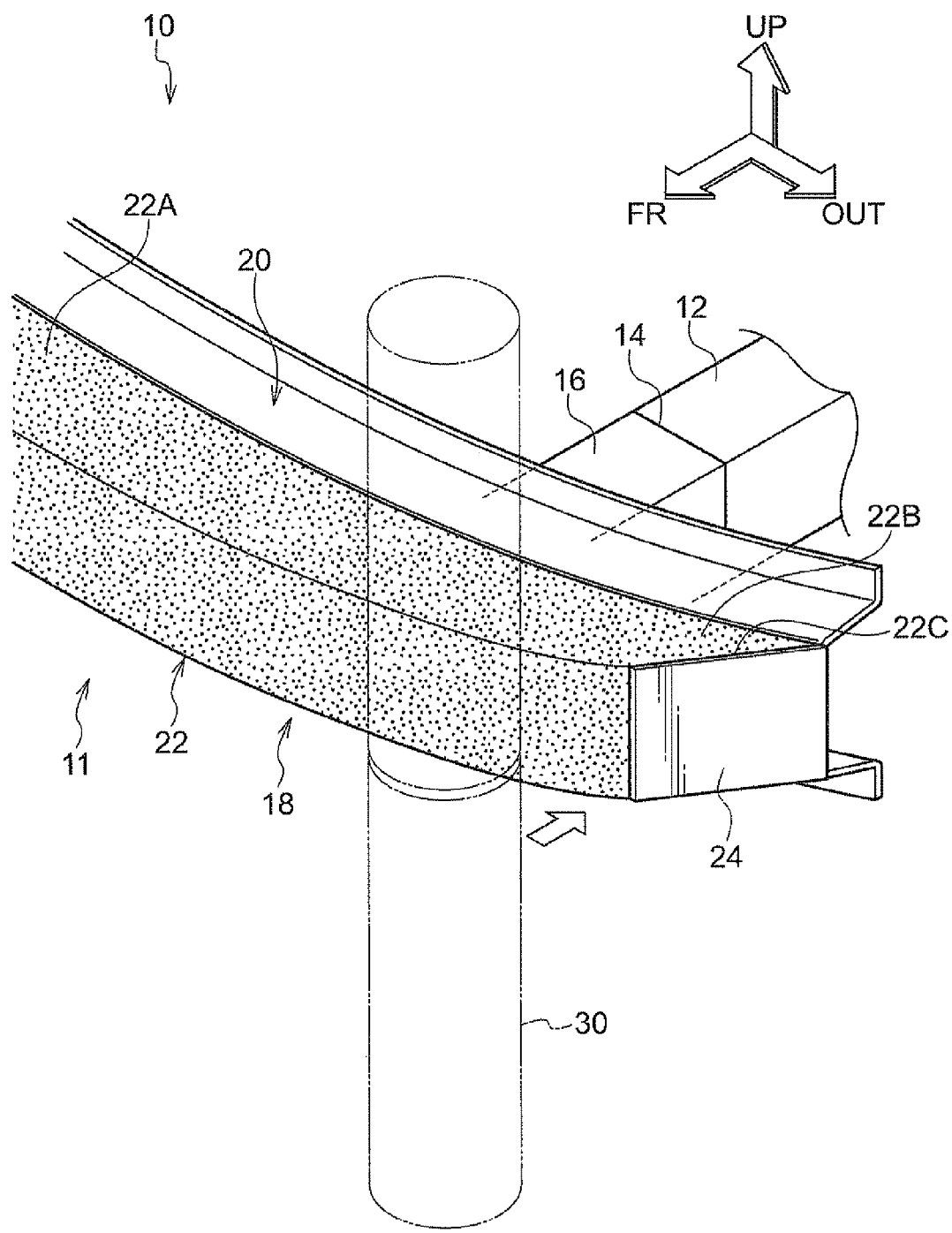
FIG. 1 is a perspective view showing one side end portion in a vehicle transverse direction of a bumper structure relating to a first embodiment.
Figure 2:
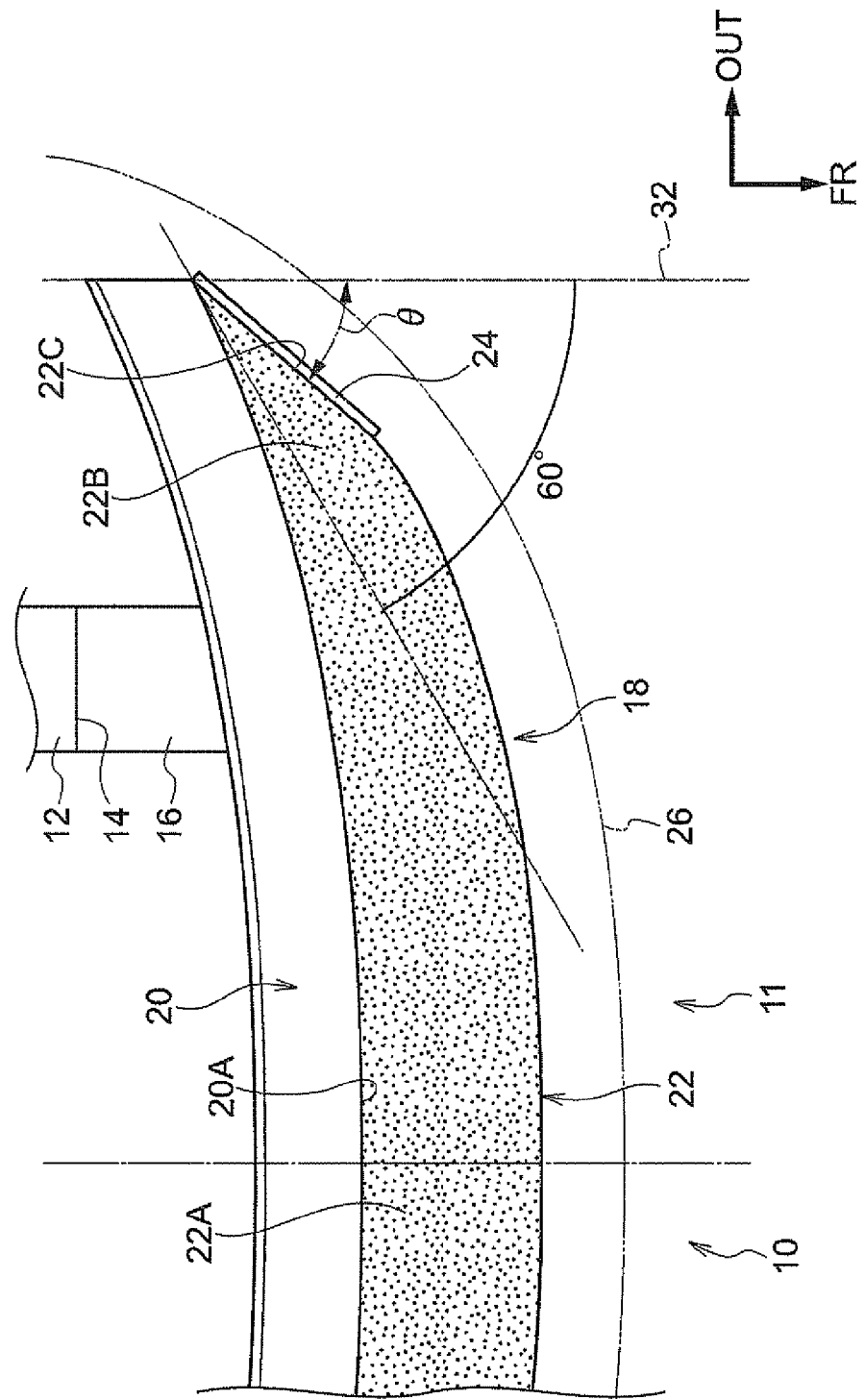
FIG. 2 is a plan view showing the one side end portion in the vehicle transverse direction of the bumper structure relating to the first embodiment.

A vehicle transverse direction right side portion, as seen from the vehicle front side, of a bumper structure relating to the present embodiment is shown in a perspective view in FIG. 1. The vehicle transverse direction right side portion, as seen from the vehicle front side, of the bumper structure relating to the present embodiment is shown in a plan view in FIG. 2. As shown in FIG. 1 and FIG. 2, front side members 12, that serve as vehicle skeleton members and extend along the vehicle front-rear direction, are disposed at both sides of a front portion 11 of a vehicle 10. A crash box 16, that serves as an impact absorbing portion and is formed in the shape of a tube, is provided, via a mounting plate 14, at the vehicle front of the front side member 12. A front bumper, to which a bumper structure 18 of the present embodiment is applied, is mounted along the vehicle transverse direction to the vehicle front sides of the crash boxes 16. Note that the front side members 12, the mounting plates 14, the crash boxes 16 and the bumper structure 18 of the present embodiment have left-right symmetry as seen in a vehicle front view and a vehicle plan view, and therefore, only the vehicle transverse direction right side as seen in a vehicle plan view is illustrated in FIG. 1 and FIG. 2, and the vehicle transverse direction left side is omitted.

The bumper structure 18 has a front bumper reinforcement 20 that serves as an example of a bumper reinforcement that extends along the vehicle transverse direction at the vehicle front side of the crash boxes 16, and a bumper absorber 22 that serves as an example of an impact absorbing member that extends along the vehicle transverse direction at the vehicle front side (the vehicle front-rear direction outer side) of the front bumper reinforcement 20.

The front bumper reinforcement 20 is a bumper skeleton member made of metal, and is formed in a substantial hat shape in cross-section as seen in a vehicle side view, and is disposed such that the vehicle rear side thereof is open. The front bumper reinforcement 20 is made into a curved shape such that, as seen in a vehicle plan view, the vehicle transverse direction central portion projects-out further toward the vehicle front side than the vehicle transverse direction both end portions. Note that the shape of the front bumper reinforcement 20 is not limited to the present embodiment and may be changed, and, for example, may be a member whose cross-section is closed in a substantially rectangular shape as seen in a vehicle side view.

The cross-section of the bumper absorber 22 as seen in a vehicle side view is formed in a substantial rectangular shape, and the bumper absorber 22 is formed by a foamed resin material such as urethane foam or the like. The rear surface portion of the bumper absorber 22 is disposed in a state of planarly-contacting a front surface portion 20A of the front bumper reinforcement 20, and the bumper absorber 22 is fixed to the front bumper reinforcement 20 by unillustrated mounting fixtures such as clips or the like. The bumper absorber 22 is made into a curved shape in which, as seen in a vehicle plan view, a central portion 22A in the vehicle transverse direction projects-out further toward the vehicle front side than end portions 22B at the vehicle transverse direction both sides. Further, at the bumper absorber 22, as seen in a vehicle plan view, the thickness in the vehicle front-rear direction at the central portion 22A in the vehicle transverse direction is formed to be thicker than the thickness in the vehicle front-rear direction at the end portions 22B at the vehicle transverse direction both sides.

As shown in FIG. 1 and FIG. 2, the outer side surface of the end portion 22B in the vehicle transverse direction at the bumper absorber 22 is made to be an inclined surface 22C that is inclined toward the vehicle transverse direction outer side, from the vehicle front-rear direction outer side toward the vehicle front-rear direction inner side. Namely, the inclined surface 22C of the bumper absorber 22 is a vertical wall that is disposed along the vehicle vertical direction, and is disposed so as to, as seen in a vehicle plan view, project toward the vehicle transverse direction outer side from the vehicle front side toward the vehicle rear side. In the present embodiment, the inclined surface 22C is formed to be substantially planar. Further, the inclined surface 22C is formed by cutting, at an incline, the outer side surface of the end portion 22B in the vehicle transverse direction of the bumper absorber 22 that is formed of a foamed resin material, such that the vehicle rear side projects further toward the vehicle transverse direction outer side than the vehicle front side.

Further, the bumper structure 18 has a plate-shaped member 24 that is mounted to the inclined surface 22C of the bumper absorber 22. The plate-shaped member 24 is formed from a material that has higher rigidity than the bumper absorber 22, and, in the present embodiment, a metal plate of iron or the like is used. The plate-shaped member 24 is adhered to the inclined surface 22C of the bumper absorber 22 by an adhesive. Note that the plate-shaped member 24 is not limited to a metal plate of iron or the like, and a hard resin material or wood material or the like may be used provided that it is a material that has higher rigidity than the bumper absorber 22.

As shown in FIG. 2, as seen in a vehicle plan view, the inclined surface 22C of the bumper absorber 22 and the surface of the plate-shaped member 24 are disposed such that an angle θ with respect to an imaginary line 32, that runs along the vehicle front-rear direction, satisfies $0° < θ ≤ 60°$.

Figure 3:
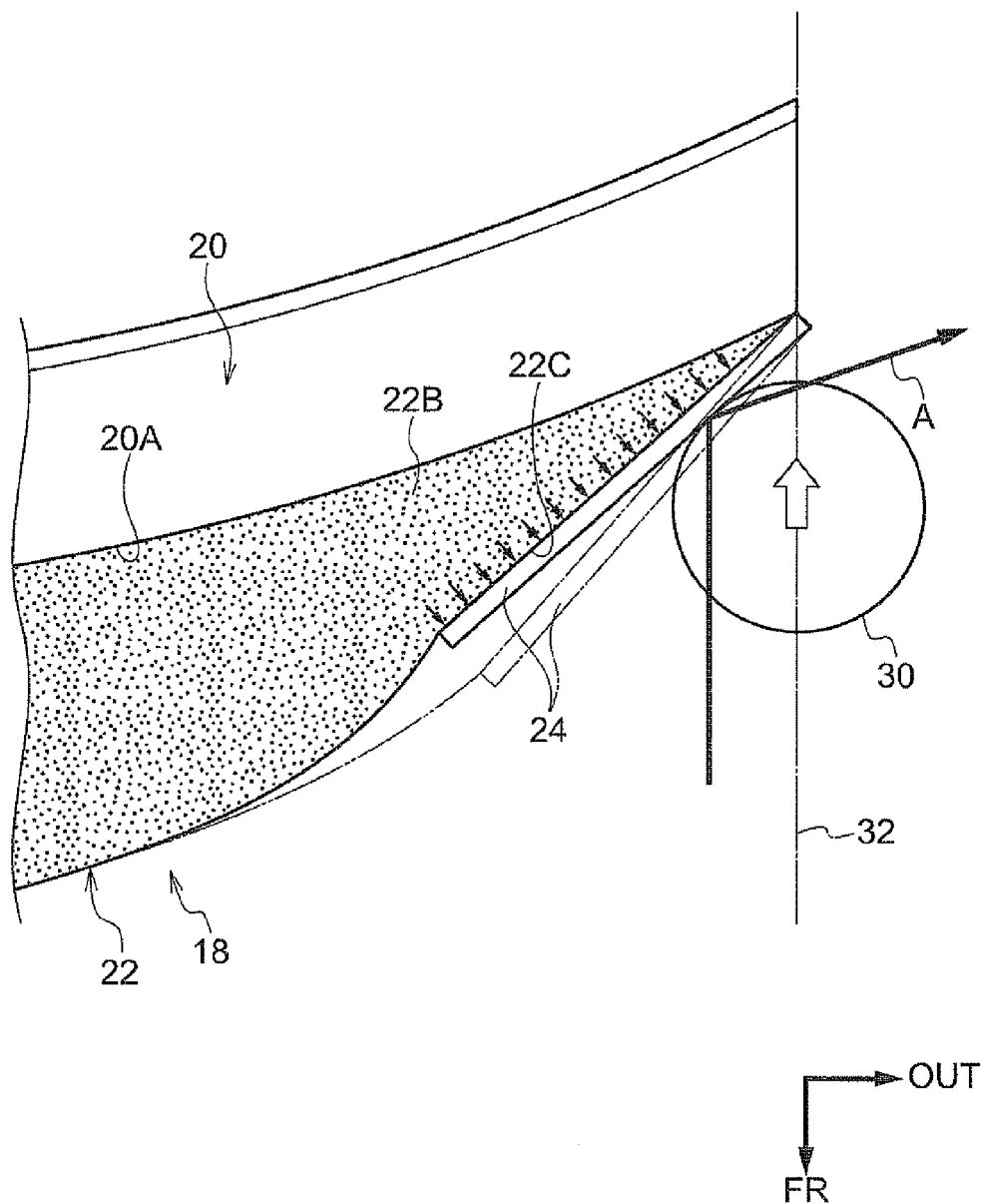
FIG. 3 is a plan view showing a state in which a collision body collides with a plate-shaped member, that is provided at a vehicle transverse direction end portion of a bumper absorber at the bumper structure shown in FIG. 2.
Figure 4:
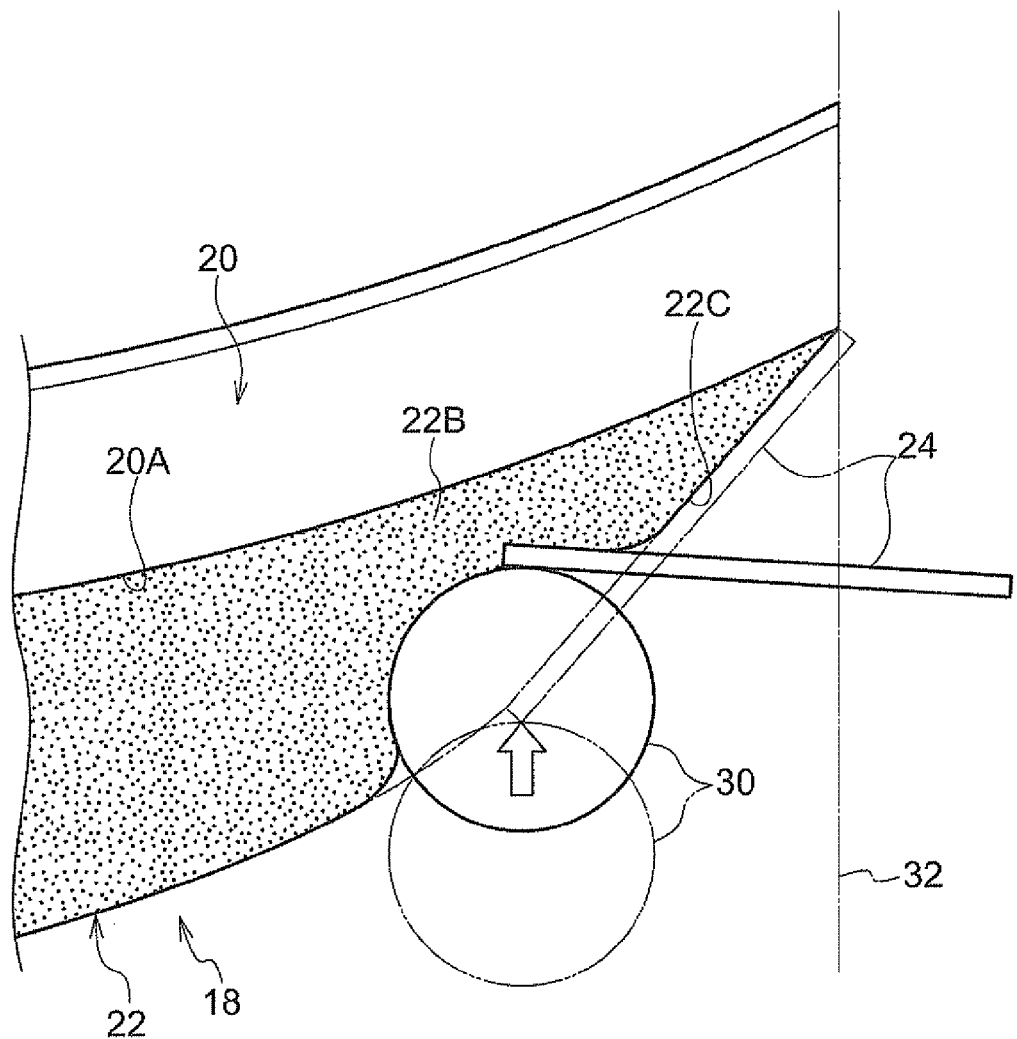
FIG. 4 is a plan view showing a state in which the plate-shaped member separates, when the collision body collides with a vehicle transverse direction inner side region that includes the vehicle transverse direction end portion of the bumper absorber at the bumper structure shown in FIG. 2.

At this bumper structure 18, when a collision body 30 collides with the bumper absorber 22, the bumper absorber 22 is crushed in the vehicle front-rear direction (the thickness direction of the bumper absorber 22) and absorbs the impact energy. At this time, as shown in FIG. 3, due to the plate-shaped member 24 being fixed by an adhesive to the inclined surface 22C of the bumper absorber 22, when the collision body 30 collides with the vehicle transverse direction end portion of the front portion 11 of the vehicle 10, the collision body 30 is repelled in the vehicle lateral direction (toward the vehicle transverse direction outer side) by the plate-shaped member 24 of the inclined surface 22C of the bumper absorber 22, and the collision body 30 is prevented from hitting the bottom of (abutting) the front bumper reinforcement 20 via the bumper absorber 22. Further, as shown in FIG. 4, due to the plate-shaped member 24 being adhered to the inclined surface 22C of the bumper absorber 22, accompanying the deformation of the bumper absorber 22 due to the input of impact load to a vehicle transverse direction inner side region that includes the end portion 22B in the vehicle transverse direction of the bumper absorber 22, the adhered portion of the plate-shaped member 24 and the inclined surface 22C is peeled, and the plate-shaped member 24 separates from the bumper absorber 22.

Note that a bumper cover 26, that covers the bumper absorber 22 from the vehicle front side, is provided at the vehicle front side of the bumper absorber 22 (see FIG. 2).

Operation and effects of the present embodiment are described next.

As shown in FIG. 1 and FIG. 2, the bumper absorber (impact absorbing member) 20 is provided at the vehicle front side of the front bumper reinforcement 20 that extends along the vehicle transverse direction. The inclined surfaces 22C, that are inclined toward the vehicle transverse direction outer sides from the vehicle front side toward the vehicle rear side, are formed at the outer side surfaces of the end portions 22B in the vehicle transverse direction of the bumper absorber 22. The plate-shaped members 24, that are formed of metal and have higher rigidity than the bumper absorber 22, are mounted by an adhesive to the inclined surfaces 22C of the bumper absorber 22.

Due thereto, as shown in FIG. 3, when the collision body 30 collides, from the vehicle front side, with the end portion 22B in the vehicle transverse direction of the bumper absorber 22, the collision body 30 hits the plate-shaped member 24 (the two-dot chain line in FIG. 3) that is provided at the inclined surface 22C of the bumper absorber 22, and a vicinity of the inclined surface 22C of the bumper absorber 22 at the vehicle rear side of the plate-shaped member 24 is crushed toward the vehicle rear side, and the collision body 30 is repelled in the vehicle lateral direction (toward the vehicle transverse direction outer side) by the plate-shaped member 24 as shown by arrow A (refer to the solid line in FIG. 3). Due thereto, the collision body 30 can be prevented from hitting the bottom of the front bumper reinforcement 20 via the bumper absorber 22. Further, due to the impact, that the plate-shaped member 24 receives, being received at the entire inclined surface 22C of the bumper absorber 22 (being transmitted to the bumper absorber 22 by the entire inclined surface 22C), the initial reaction force can be increased.

Further, as shown in FIG. 4, when the collision body 30 collides with a vehicle transverse direction inner side region (the portion that contacts the vehicle transverse direction inner side end portion of the plate-shaped member 24 in FIG. 4) that includes the end portion 22B in the vehicle transverse direction of the bumper absorber 22 (the two-dot chain line in FIG. 4 shows the instant of the collision), due to the plate-shaped member 24 being mounted by an adhesive to the inclined surface 22C of the bumper absorber 22, accompanying the deformation of the bumper absorber 22 due to the input of the impact load, the adhered portion of the plate-shaped member 24 and the inclined surface 22C is peeled, and the plate-shaped member 24 separates from the bumper absorber 22 (the solid line in FIG. 4 illustrates in the midst of the collision). Due thereto, even when the plate-shaped member 24 that has higher rigidity than the bumper absorber 22 is provided, the effects due to the plate-shaped member 24 on the impact mitigation of the bumper absorber 22 can be lessened. Namely, the bumper absorber 22 can generate load that is similar to that when the plate-shaped member 24 is not provided.

Moreover, constraints in terms of the design can be reduced by making the thickness in the vehicle front-rear direction of the bumper absorber 22 thin, by forming the inclined surface 22C by cutting the outer side surface of the end portion 22B in the vehicle transverse direction of the bumper absorber 22 at an incline such that the vehicle rear side thereof projects out further toward the vehicle transverse direction outer side than the vehicle front side.

Figure 5:
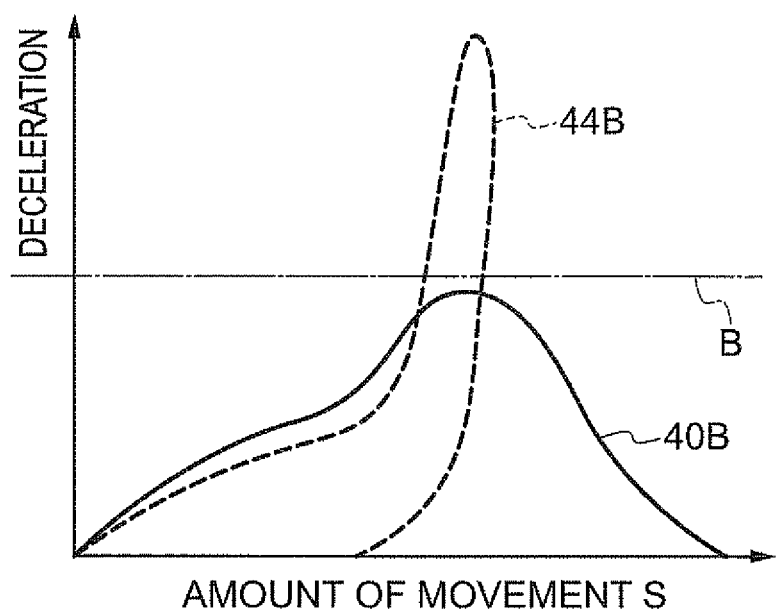
FIG. 5 is a graph that compares the relationship between deceleration and an amount of movement of the collision body when the collision body collides with the plate-shaped member of the vehicle transverse direction end portion of the bumper absorber, with a case in which the plate-shaped member is not provided.
Figure 25:
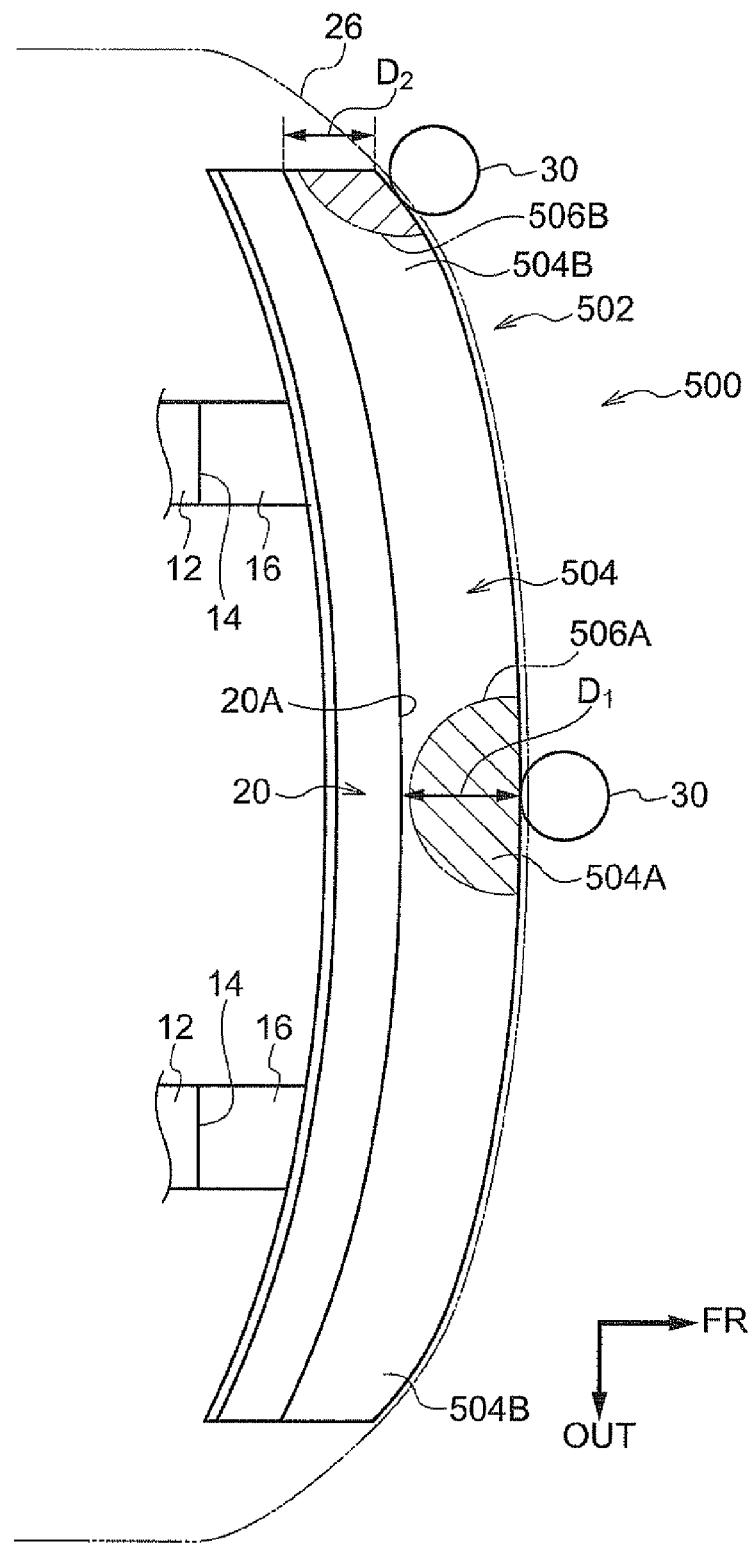
FIG. 25 is a plan view that explains deformation areas of a vehicle transverse direction end portion and a vehicle transverse direction central portion of a bumper absorber in a bumper structure relating to a conventional example.

The relationship between the deceleration and the amount of movement (stroke) of the collision body 30 when the collision body 30 collides from the vehicle front side with the end portion 22B in the vehicle transverse direction of the bumper absorber 22, is shown in FIG. 5. The deceleration of the collision body 30 is measured by setting an accelerometer at the interior of the collision body 30. In FIG. 5, the relationship between the deceleration and the amount of movement of the collision body 30 at the bumper structure 18 of the present embodiment is shown by solid line 40B. Further, in FIG. 5, the relationship between the deceleration and the amount of movement of the collision body 30 in a case in which an inclined surface is not provided at the vehicle transverse direction end portion of the bumper absorber and a plate-shaped member is not provided (see FIG. 25) as a bumper structure of a comparative example, is shown by dotted line 44B. As shown in FIG. 5, in the bumper structure 18 of the present embodiment, the collision body 30 is repelled in the vehicle lateral direction (toward the vehicle transverse direction outer side) by the plate-shaped member 24, and the deceleration of the collision body 30 is less than or equal to a target value (B shown in FIG. 5). In contrast, in the bumper structure of the comparative example, the collision body 30 hits the bottom of the front bumper reinforcement 20 via the bumper absorber, and the deceleration of the collision body 30 exceeds the target value B. Accordingly, in the bumper structure 18 of the present embodiment, the collision body 30 is prevented from hitting the bottom of the front bumper reinforcement 20 via the bumper absorber 22, and the impact can be mitigated. Therefore, pedestrian protection can be ensured.

Figure 6:
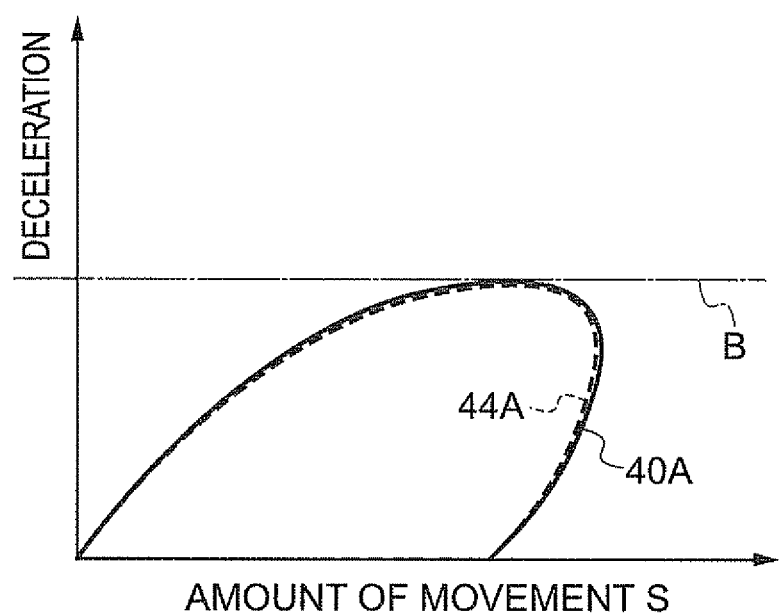
FIG. 6 is a graph that compares the relationship between deceleration and an amount of movement of the collision body at the time when the collision body collides with a vehicle transverse direction central portion of the bumper absorber, with a case in which the plate-shaped member is not provided.

The relationship between deceleration and the amount of movement (stroke) of the collision body 30 when the collision body 30 collides with a vehicle transverse direction inner side region (the portion that contacts the vehicle transverse direction inner side end portion of the plate-shaped member 24 in FIG. 4) that includes the end portion 22B in the vehicle transverse direction of the bumper absorber 22, is shown in FIG. 6. In FIG. 6, the relationship between the deceleration and the amount of movement of the collision body 30 at the bumper structure 18 of the present embodiment is shown by solid line 40A. The relationship between deceleration and the amount of movement of the collision body 30 in a case (see FIG. 25) in which an inclined surface is not provided at the vehicle transverse direction end portion of the bumper absorber and a plate-shaped member is not provided as the bumper structure of the comparative example, is shown by dotted line 44A. As shown in FIG. 6, in the bumper structure 18 of the present embodiment, due to the plate-shaped member 24 separating from the bumper absorber 22 accompanying the deformation of the bumper absorber 22 due to the input of impact load, the bumper absorber 22 generates load that is similar to that of the bumper structure of the comparative example to which the plate-shaped member 24 is not mounted.

Here, the aforementioned bumper structure of the comparative example is described. The front portion of a vehicle 500, to which a bumper structure 502 of the comparative example is applied, is shown in a plan view in FIG. 25.

As shown in FIG. 5, at the bumper structure 502, a bumper absorber 504, that extends along the vehicle transverse direction, is disposed at the vehicle front side of the front bumper reinforcement 20 that extends along the vehicle transverse direction at the front end portion of the vehicle 500. The bumper absorber 504 is formed in a curved shape such that a central portion 504A in the vehicle transverse direction projects-out further toward the vehicle front side than end portions 504B in the vehicle transverse direction (here, the relationship between a thickness $D_1$ of the vehicle transverse direction central portion of the bumper absorber and a thickness $D_2$ of the vehicle transverse direction end portions is $D_1=D_2$).

At this bumper structure 502, a deformation area 506B, at the end portion 504B in the vehicle transverse direction of the bumper absorber 504, is small as compared with a deformation area 506A at the central portion 504A in the vehicle transverse direction. Therefore, at the central portion 504A in the vehicle transverse direction of the bumper absorber 504, when the collision body 30 collides, sufficient energy can be absorbed (refer to dotted line 510A of the graph shown in FIG. 26). However, at the end portion 504B in the vehicle transverse direction of the bumper absorber 504, when the collision body 30 collides, there is the possibility that sufficient energy absorption cannot come about and that the collision body 30 will hit the bottom of the front bumper reinforcement 20 via the bumper absorber 504 (refer to solid line 512B of the graph shown in FIG. 26).

Figure 26:
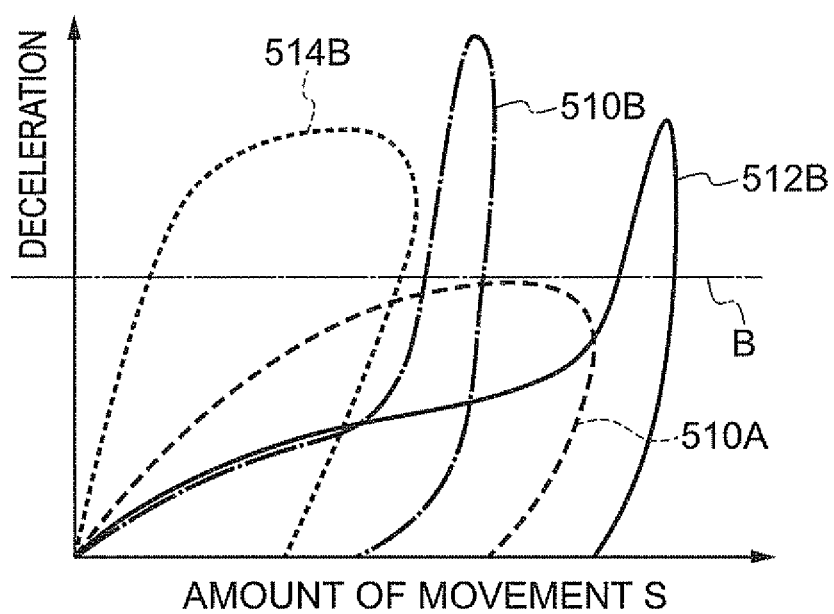
FIG. 26 is a graph that compares the relationship between deceleration and an amount of movement of a collision body when the collision body collides with the vehicle transverse direction end portion and the vehicle transverse direction central portion of the bumper absorber at the bumper structure relating to the conventional example, with the first embodiment.

Generally, there are usually cases in which, at the end portion 504B in the vehicle transverse direction of the bumper absorber 504, the constraints in terms of design are severe and a sufficient thickness of the bumper absorber 504 cannot be ensured (refer to one-dot chain line 510B of the graph shown in FIG. 26). For example, when the bumper absorber 504 is hardened in an attempt to increase the load only at the end portions 504B in the vehicle transverse direction of the bumper absorber 504, there are cases in which this will also affect the central portion 504A in the vehicle transverse direction of the bumper absorber 504. In a case in which the thickness of the end portions 504B in the vehicle transverse direction of the bumper absorber 504 is insufficient to begin with (the example of $D_2<D_1$ in FIG. 25), when the load is increased in order to avoid the collision body 30 hitting the bottom of the front bumper reinforcement 20 via the bumper absorber 504, there are cases in which the target value B of the deceleration is exceeded (refer to dotted line 514B of the graph shown in FIG. 26).

In contrast, in the bumper structure 18 of the present embodiment, as shown in FIG. 3, when the collision body 30 collides with the end portion 22B in the vehicle transverse direction of the bumper absorber 22, the collision body 30 can be prevented from hitting the bottom of the front bumper reinforcement 20 via the bumper absorber 22, due to the collision body 30 being repelled in the vehicle lateral direction (toward the vehicle transverse direction outer side) by the plate-shaped member 24 that is adhered to the inclined surface 22C of the bumper absorber 22. Further, as shown in FIG. 4, when the collision body 30 collides with the vehicle transverse direction inner side region that includes the end portion 22B in the vehicle transverse direction of the bumper absorber 22, due to the plate-shaped member 24 separating from the bumper absorber 22 accompanying the deformation of the bumper absorber 22 due the input of impact load, the effects on the impact mitigation of the bumper absorber 22 can be reduced even when the plate-shaped member 24, that has higher rigidity than the bumper absorber 22, is provided.

Next, a second embodiment of a bumper structure relating to the present invention is described by using FIG. 7 through FIG. 10. Note that structural portions that are the same as in the above-described first embodiment are denoted by the same numbers, and description thereof is omitted.

Figure 7:
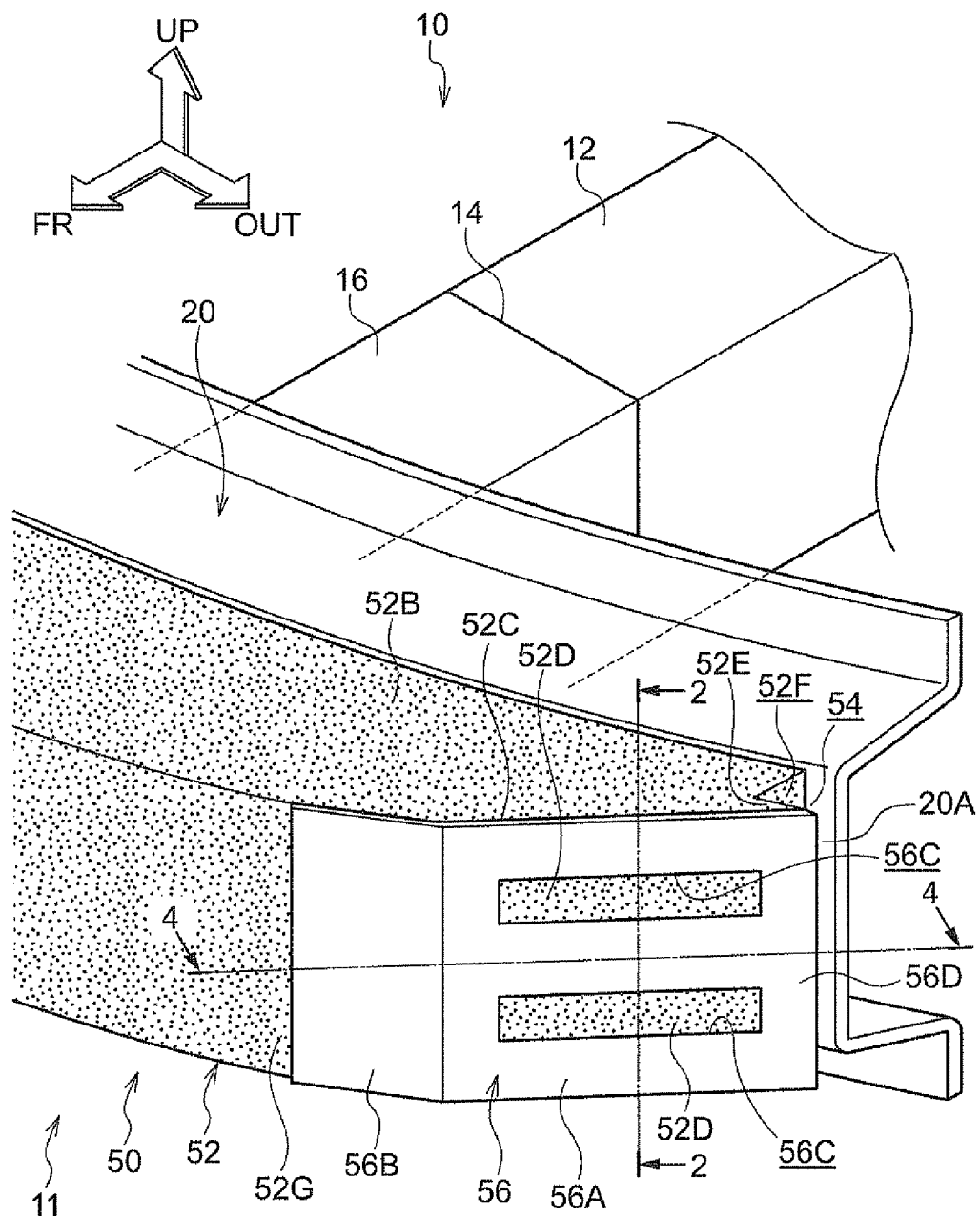
FIG. 7 is a perspective view showing one side end portion in a vehicle transverse direction of a bumper structure relating to a second embodiment.
Figure 9:
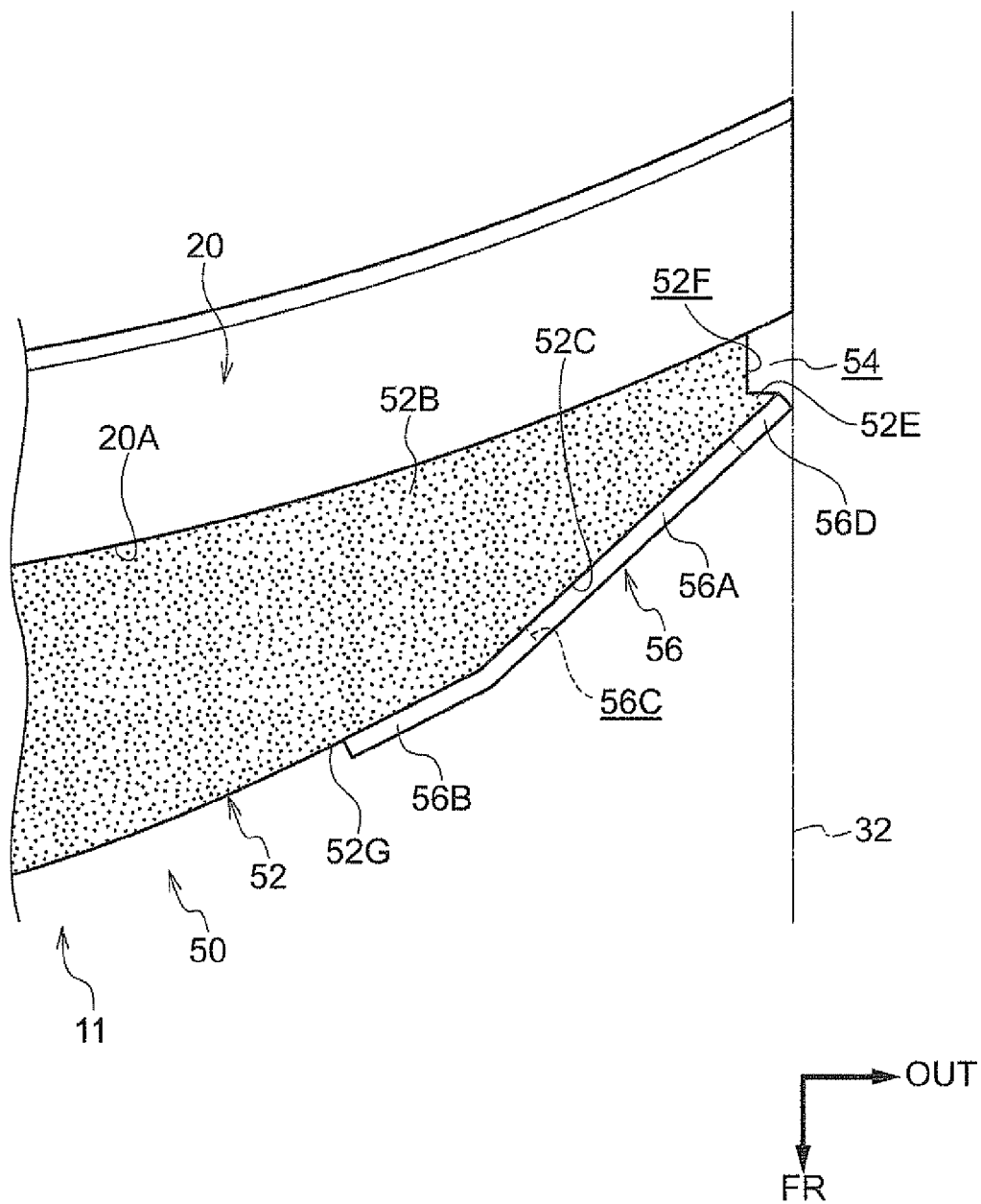
FIG. 9 is a lateral sectional view at line 4-4 in FIG. 7.

As shown in FIG. 7 and FIG. 9, a bumper structure 50 of the present embodiment has a bumper absorber 52 that is made of a foamed resin and serves as an example of an impact absorbing member that extends along the vehicle transverse direction at the vehicle front side (vehicle front-rear direction outer side) of the front bumper reinforcement 20. The outer side surface of an end portion 52B in the vehicle transverse direction at the bumper absorber 52 is made to be an inclined surface 52C that is inclined toward the vehicle transverse direction outer side, from the vehicle front side toward the vehicle rear side. Namely, the inclined surface 52C of the bumper absorber 52 is disposed so as to, as seen in a vehicle plan view, project toward the vehicle transverse direction outer side from the vehicle front side toward the vehicle rear side. A plate-shaped member 56 (e.g., a metal plate of iron or the like), that is structured by a material that has higher rigidity than the bumper absorber 52, is mounted to the inclined surface 52C.

The plate-shaped member 56 has a vertical wall portion 56A, that is substantially planar and is mounted to the inclined surface 52C of the bumper absorber 52, and a bent portion 56B that is bent so as to wrap-around toward a front surface 52G (the surface at the vehicle transverse direction inner side of the inclined surface 52C) of the bumper absorber 52 at the vehicle transverse direction inner side of the vertical wall portion 56A.

Figure 8:
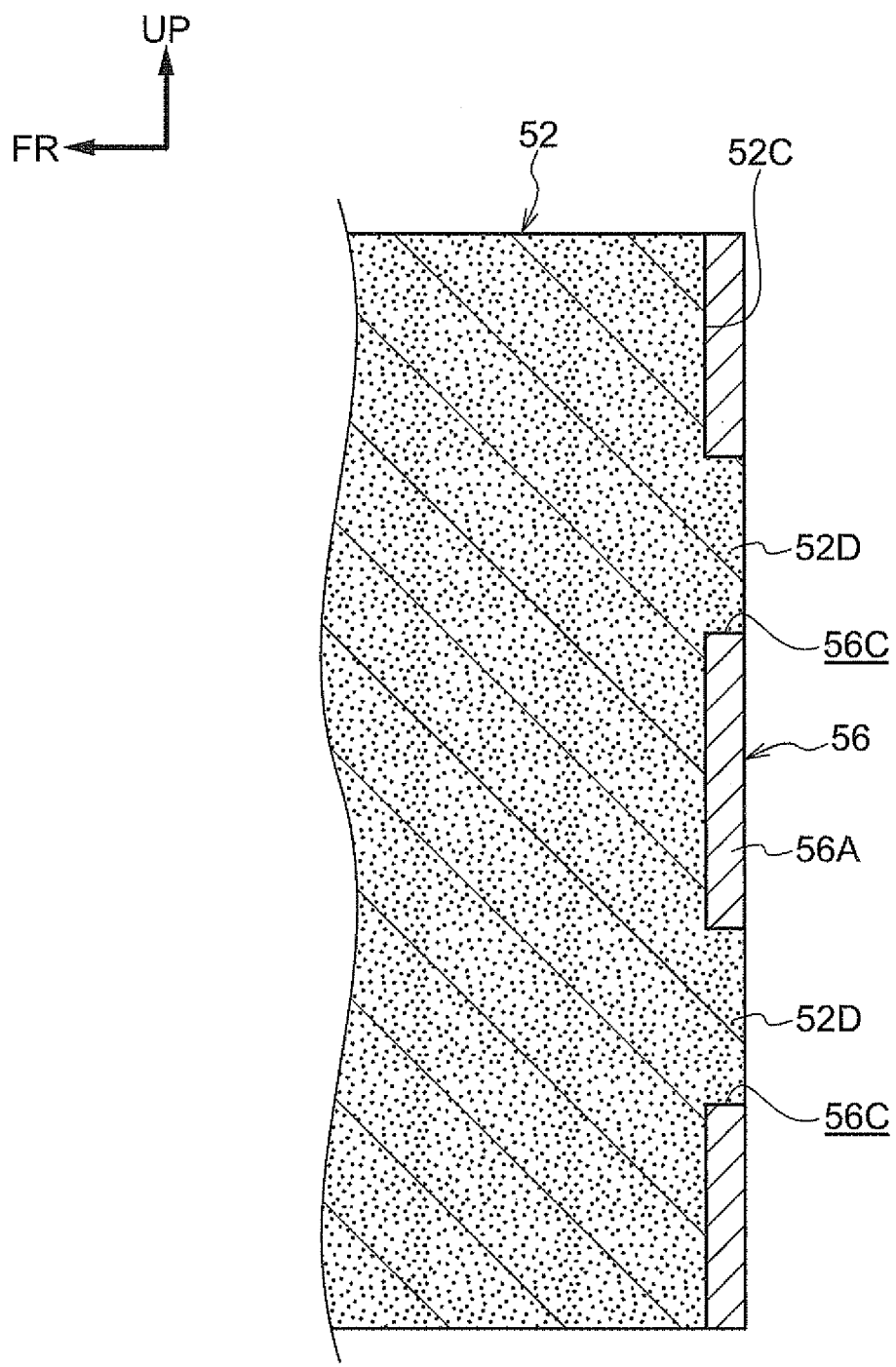
FIG. 8 is a vertical sectional view at line 2-2 in FIG. 7.

Two openings (portions to be engaged) 56C, that are rectangular and are disposed along the vehicle transverse direction, are provided at the vertical wall portion 56A of the plate-shaped member 56, with an interval therebetween in the vehicle vertical direction. As shown in FIG. 8, two projections (engaging portions) 52D are formed at the inclined surface 52C of the bumper absorber 52, in accordance with the positions of the openings 56C of the plate-shaped member 56. Further, the plate-shaped member 56 is mounted to the inclined surface 52C of the bumper absorber 52 due to the projections 52D of the bumper absorber 52 being fit-in (engaged with) the openings 56C of the plate-shaped member 56 by press-fitting. When a collision body collides with a vehicle transverse direction inner side region that includes the end portion 52B in the vehicle transverse direction of the bumper absorber 52, the plate-shaped member 56 can separate due to deformation of the bumper absorber 52.

A cut-out portion 52F, at which a rear end corner portion of the bumper absorber 52 is cut-out, is provided at the vehicle rear side of an end edge 52E of the bumper absorber 52 that supports an end edge 56D at the vehicle transverse direction outer side of the vertical wall portion 56A of the plate-shaped member 56. A gap 54 in the vehicle front-rear direction is formed by this cut-out portion 52F, between the end edge 56D of the plate-shaped member 56 (the end edge 52E of the bumper absorber 52) and the front surface portion 20A of the front bumper reinforcement 20.

Figure 10:
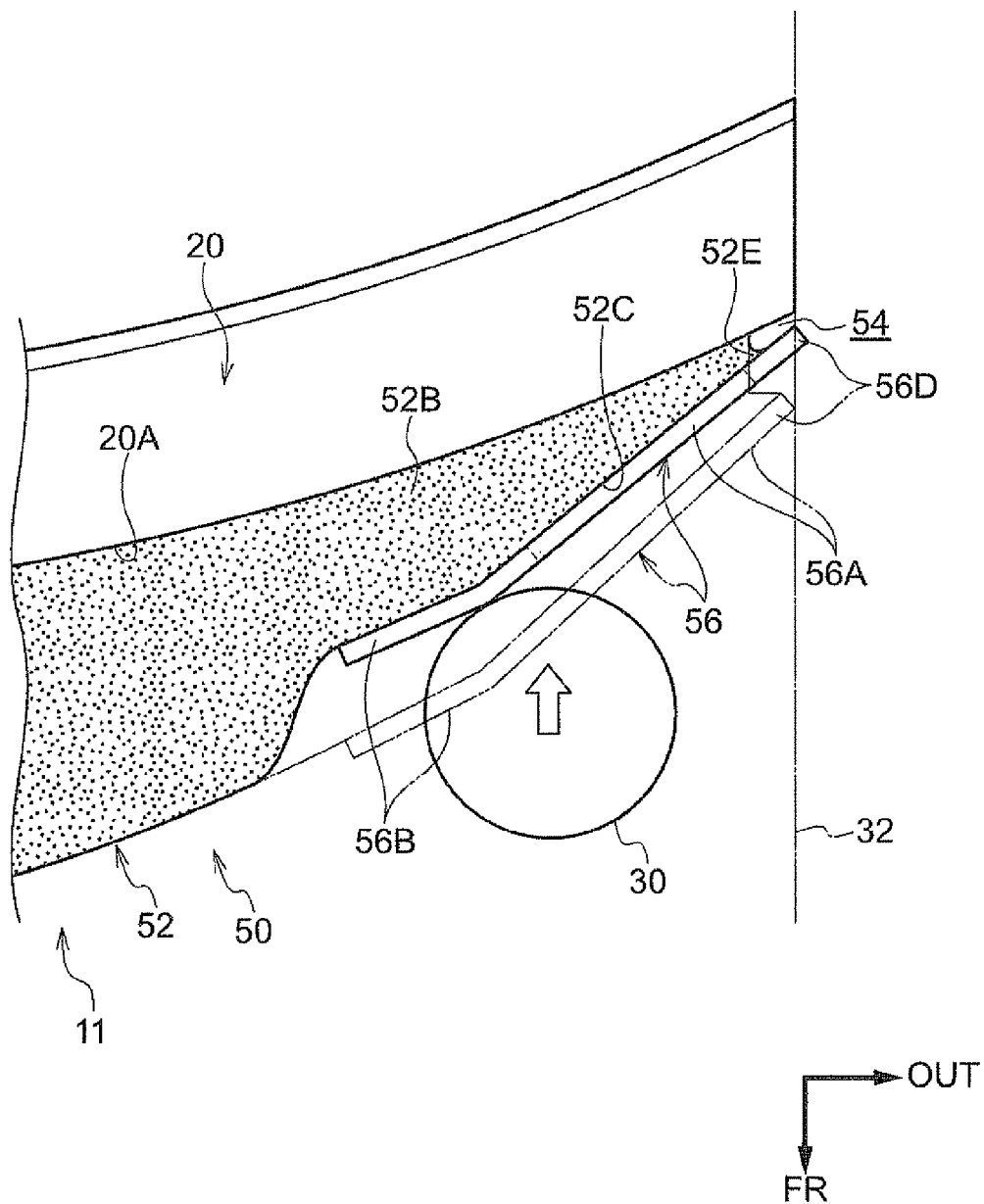
FIG. 10 is a plan view showing a state in which a collision body collides with a plate-shaped member that is provided at a vehicle transverse direction end portion of a bumper absorber at the bumper structure shown in FIG. 7.

In this bumper structure 50, by providing the gap 54 (the cut-out portion 52F) in the vehicle front-rear direction between the end edge 56D of the plate-shaped member 56 (the end edge 52E of the bumper absorber 52) and the front surface portion 20A of the front bumper reinforcement 20, as shown in FIG. 10, when the collision body 30 collides with the plate-shaped member 56, the gap 54 is crushed, and the end edge 56D of the vertical wall portion 56A of the plate-shaped member 56 withdraws straight to the vehicle rear side. Therefore, the end edge 56D of the vertical wall portion 56A of the plate-shaped member 56 protruding-out in the vehicle outer direction is suppressed, and the effect of repelling the collision body 30 in the vehicle lateral direction (toward the vehicle transverse direction outer side) does not weaken.

Further, the plate-shaped member 56 is mounted to the inclined surface 52C of the bumper absorber 52 due to the projections 52D of the bumper absorber 52 being fit-in the openings 56C of the plate-shaped member 56 by press-fitting. Due thereto, when a collision body collides with a vehicle transverse direction inner side region that includes the end portion 52B in the vehicle transverse direction of the bumper absorber 52, the engagement of the projections 52D and the openings 56C of the plate-shaped member 56 comes undone due to the deformation of the bumper absorber 52, and the plate-shaped member 56 can be separated.

Moreover, by providing the bent portion 56B at the vehicle transverse direction inner side of the vertical wall portion 56A of the plate-shaped member 56 so as to wrap-around toward the front surface 52G (the surface at the vehicle transverse direction inner side of the inclined surface 52C) of the bumper absorber 52, the mounting accuracy of the plate-shaped member 56 to the bumper absorber 52 is ensured, and the edge of the vehicle transverse direction inner side end portion of the plate-shaped member 56 projecting-out can be suppressed. Further, by providing the bent portion 56B at the vehicle transverse direction inner side of the vertical wall portion 56A of the plate-shaped member 56, when a collision body collides with the plate-shaped member 56, the initial reaction force can be increased due to load being transmitted to the bumper absorber 52 from the bent portion 56B of the plate-shaped member 56 as well. Namely, the energy absorption can be controlled by the bent portion 56B of the plate-shaped member 56.

Figure 11:
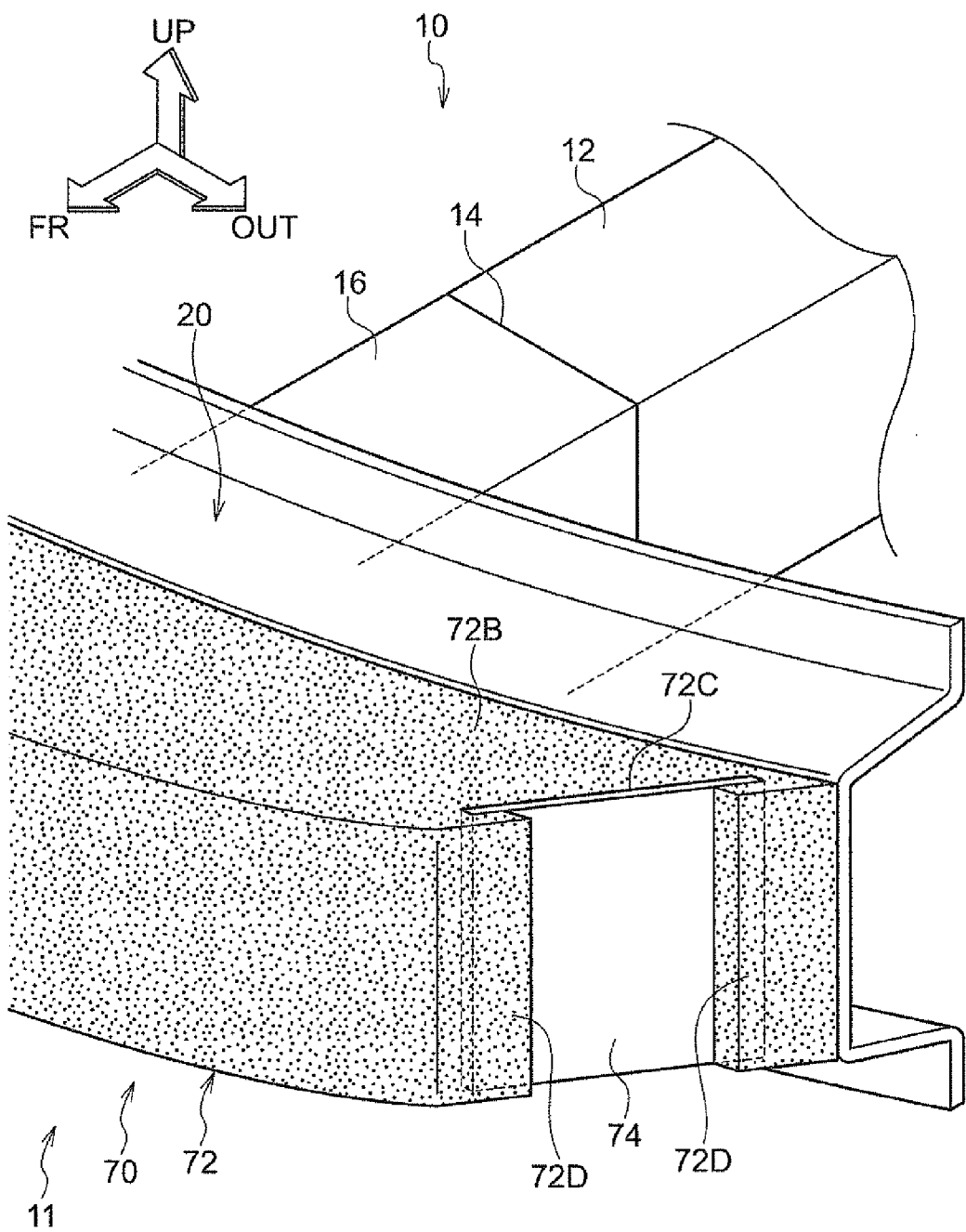
FIG. 11 is a perspective view showing one side end portion in a vehicle transverse direction of a bumper structure relating to a third embodiment.
Figure 12:
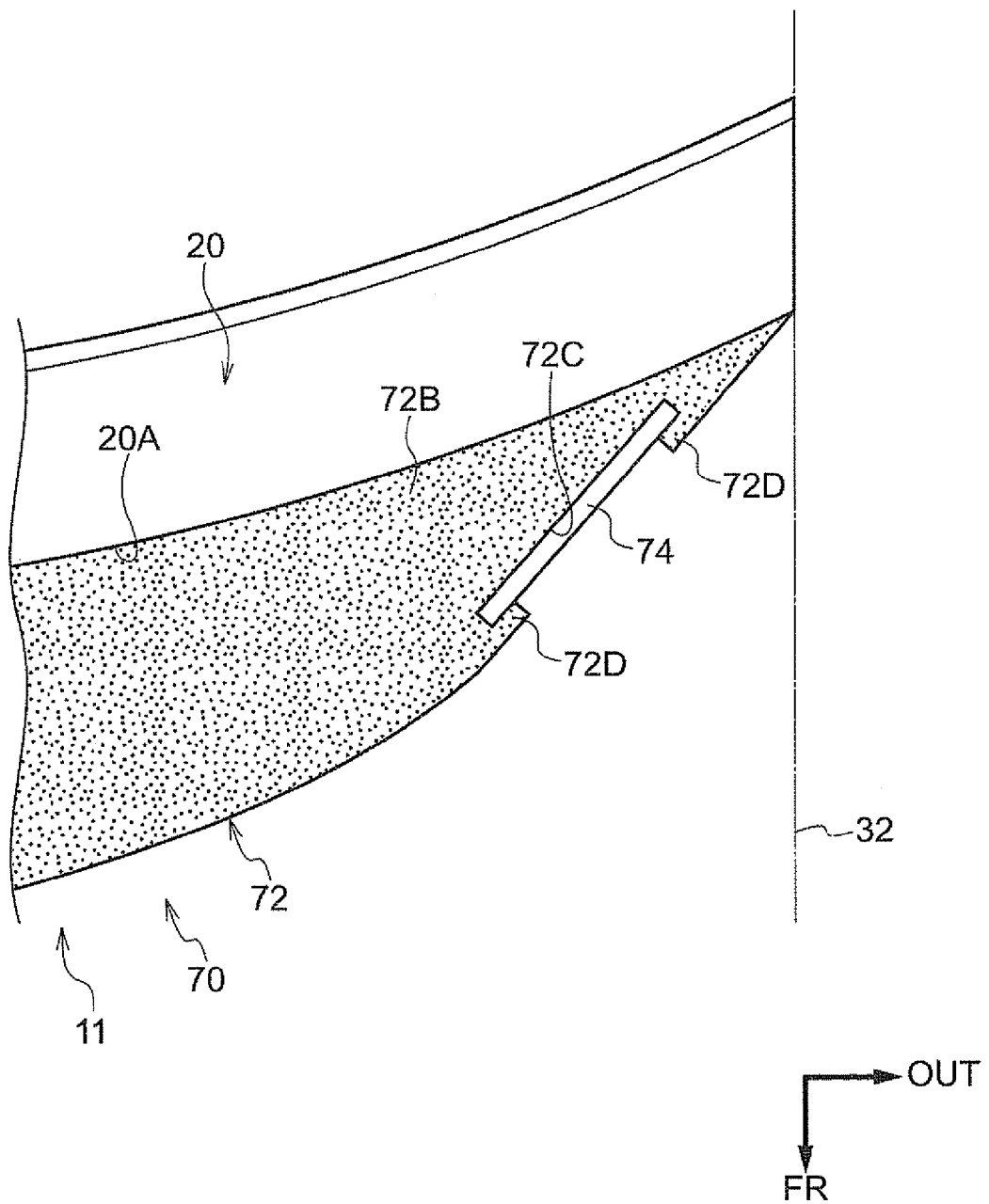
FIG. 12 is a plan view showing the one side end portion in the vehicle transverse direction of the bumper structure relating to the third embodiment.
Figure 13:
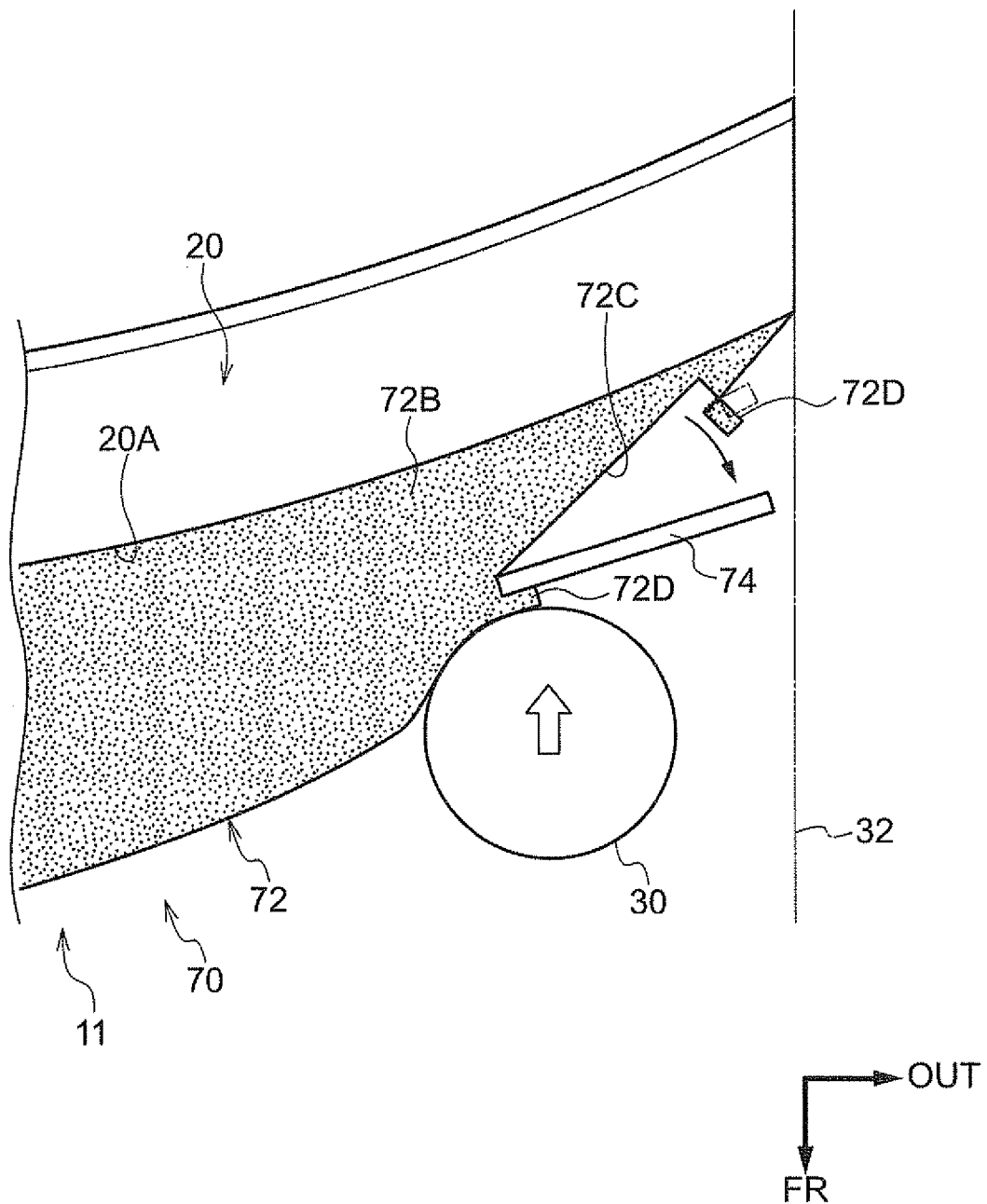
FIG. 13 is a plan view showing a state in which a plate-shaped member separates, when a collision body collides with a vehicle transverse direction inner side region that includes a vehicle transverse direction end portion of a bumper absorber at the bumper structure shown in FIG. 12.

Next, a third embodiment of a bumper structure relating to the present invention is described by using FIG. 11 through FIG. 13. Note that structural portions that are the same as in the above-described first embodiment and second embodiment are denoted by the same numbers, and description thereof is omitted.

As shown in FIG. 11 and FIG. 12, a bumper structure 70 of the present embodiment has a bumper absorber 72 that is made of a foamed resin and serves as an example of an impact absorbing member that extends along the vehicle transverse direction. The outer side surface of an end portion 72B in the vehicle transverse direction of the bumper absorber 72 is made to be an inclined surface 72C that is inclined toward the vehicle transverse direction outer side, from the vehicle front side toward the vehicle rear side. A pair of claws 72D, that extend at the front surface side of a plate-shaped member 74 and hold the plate-shaped member 74, are provided at the vehicle transverse direction both sides of the inclined surface 72C of the bumper absorber 72. Namely, the plate-shaped member 74 (e.g., a metal plate of iron or the like), that is formed from a material that has higher rigidity than the bumper absorber 72, is disposed in a planarly-contacting state at the inclined surface 72C of the bumper absorber 72, and the plate-shaped member 74 is mounted to the inclined surface 72C due to the front surface of the plate-shaped member 74 being anchored by the pair of claws 72D of the bumper absorber 72 (catching on the pair of claws 72D). The claws 72D of the bumper absorber 72 are formed integrally with the bumper absorber 72, but may be structured by separate members.

In the bumper structure 70 such as this, as shown in FIG. 13, when the collision body 30 collides with a vehicle transverse direction inner side region that includes the end portion 72B in the vehicle transverse direction of the bumper absorber 72, the claw 72D, that is at the vehicle transverse direction outer side of the bumper absorber 72 and is pushed by the plate-shaped member 74 due to the deformation of the bumper absorber 72, breaks, and the plate-shaped member 74 can be separated from the bumper absorber 72.

Figure 14:
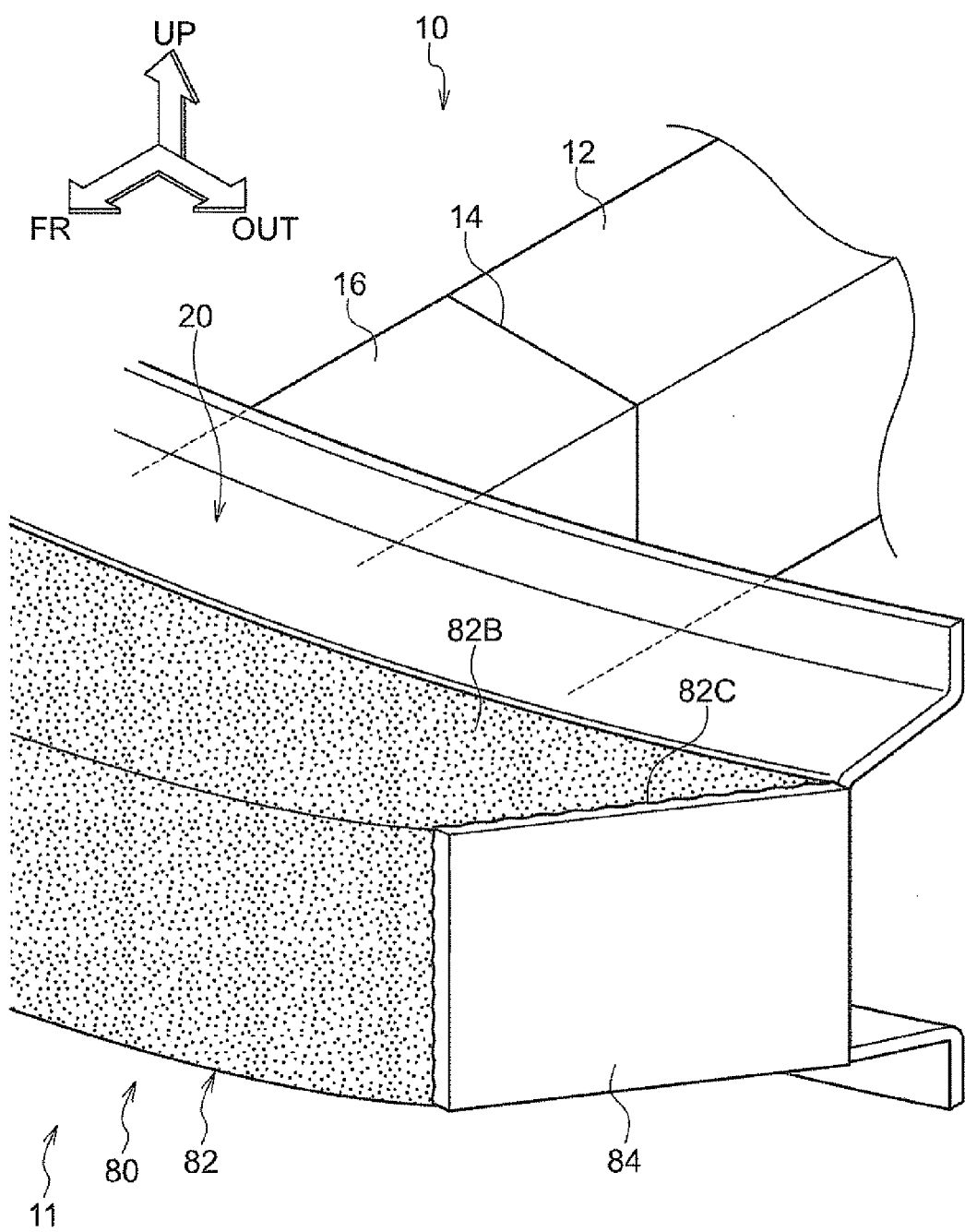
FIG. 14 is a perspective view showing one side end portion in a vehicle transverse direction of a bumper structure relating to a fourth embodiment.

Next, a fourth embodiment of a bumper structure relating to the present invention is described by using FIG. 14. Note that structural portions that are the same as in the above-described first embodiment through third embodiment are denoted by the same numbers, and description thereof is omitted.

As shown in FIG. 14, a bumper structure 80 of the present embodiment has a bumper absorber 82 that is made of a foamed resin and serves as an example of an impact absorbing member that extends along the vehicle transverse direction. The outer side surface of an end portion 82B in the vehicle transverse direction at the bumper absorber 82 is made to be a border surface 82C that has protrusions and recesses and that is disposed so as to be inclined toward the vehicle transverse direction outer side, from the vehicle front side toward the vehicle rear side, and a plate-shaped member 84 that is made of resin is joined via this border surface 82C. The plate-shaped member 84 and the bumper absorber 82 form the boundary surface 82C and are joined by welding by heat. Namely, the boundary surface 82C that has protrusions and recesses is included in the "inclined surface". It suffices for the plate-shaped member 84 to be a material that has higher rigidity than the bumper absorber 82, and the plate-shaped member 84 may be structured by being joined to the bumper absorber 82 via the boundary surface 82C by simultaneous molding of a different type of material or the like.

In the bumper structure 80 such as this, when the collision body 30 collides with a vehicle transverse direction inner side region that includes the end portion 82B in the vehicle transverse direction of the bumper absorber 82, the plate-shaped member 84 can be separated from the bumper absorber 82 due to the joining-together of the plate-shaped member 84 and the boundary surface 82C of the bumper absorber 82 coming undone accompanying the deformation of the bumper absorber 82.

Figure 15:
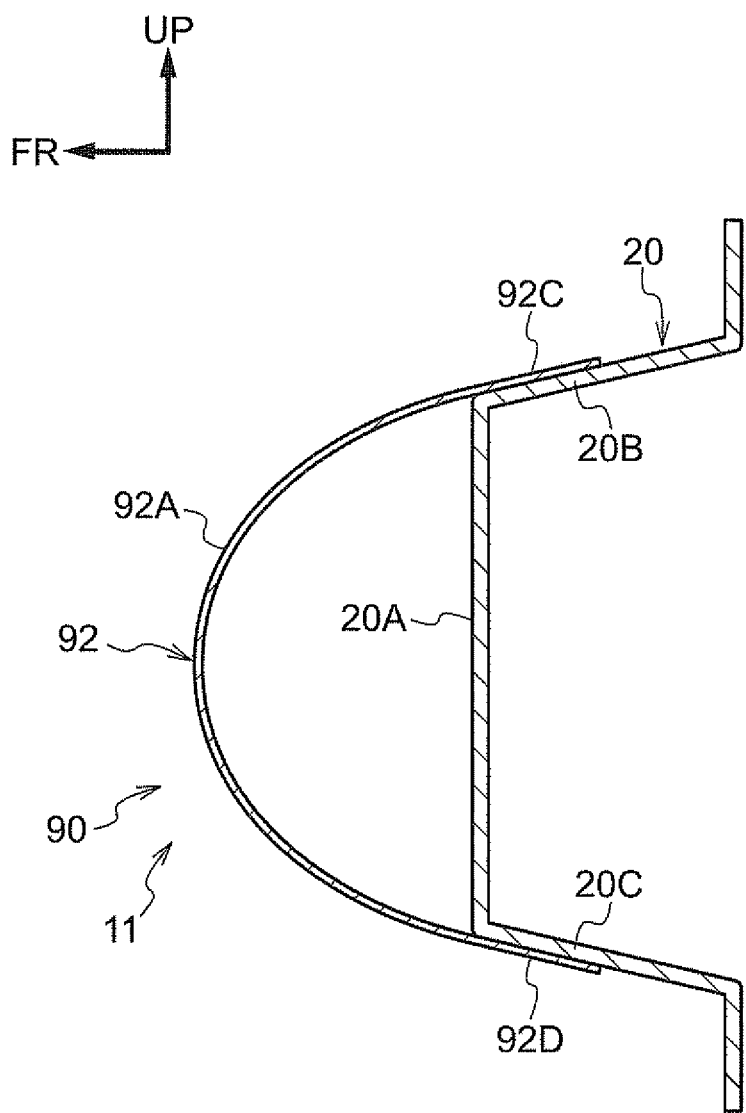
FIG. 15 is a vertical sectional view along a vehicle front-rear direction showing a bumper structure relating to a fifth embodiment.
Figure 16:
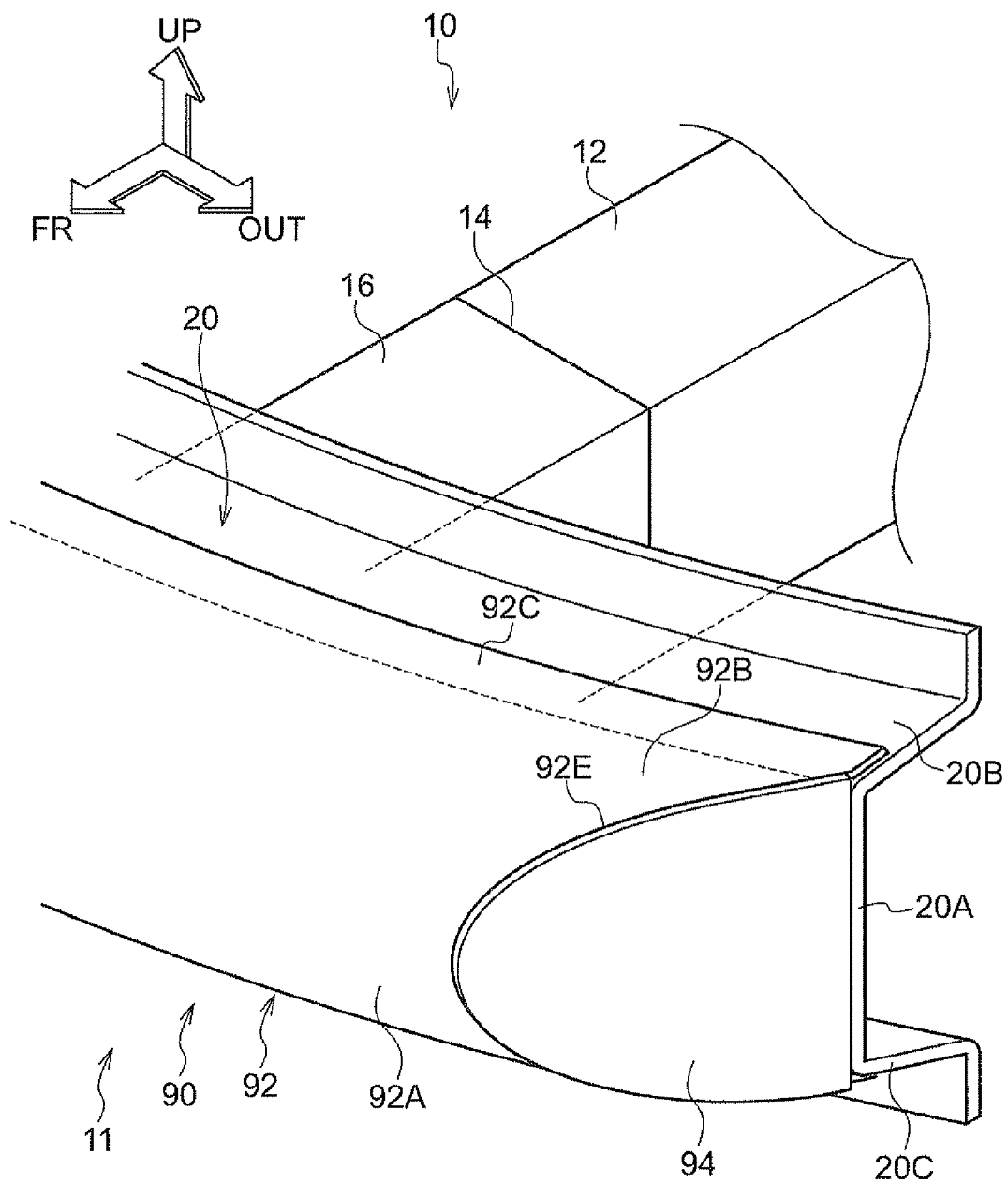
FIG. 16 is a perspective view showing one side end portion in a vehicle transverse direction of the bumper structure relating to the fifth embodiment.
Figure 17:
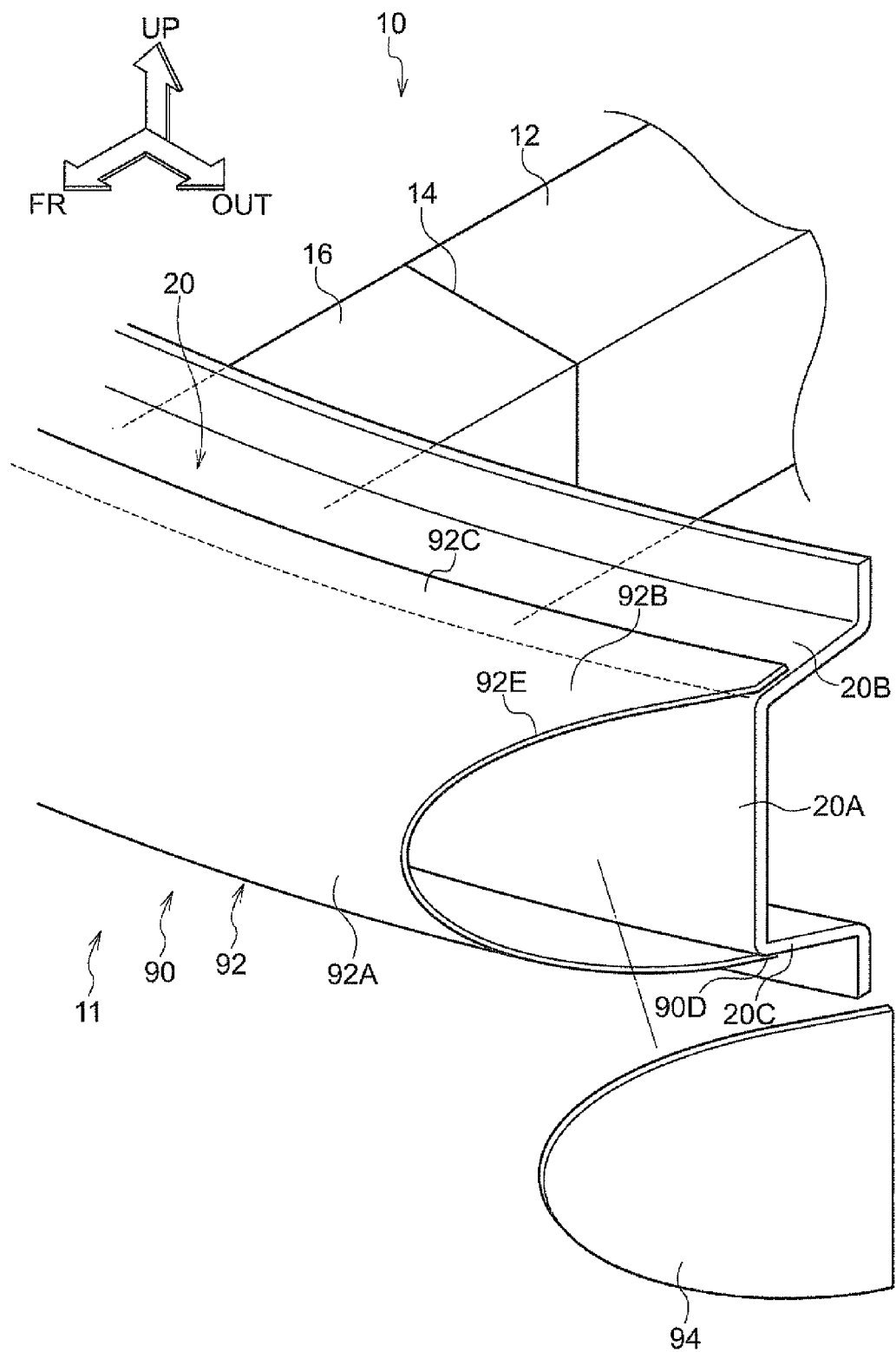
FIG. 17 is an exploded perspective view of a plate-shaped member at the one side end portion in the vehicle transverse direction of the bumper structure relating to the fifth embodiment.

Next, a fifth embodiment of a bumper structure relating to the present invention is described by using FIG. 15 through FIG. 17. Note that structural portions that are the same as in the above-described first embodiment through fourth embodiment are denoted by the same numbers, and description thereof is omitted.

As shown in FIG. 15 through FIG. 17, a bumper structure 90 of the present embodiment has a bumper absorber 92 that serves as an example of an impact absorbing member that extends along the vehicle transverse direction. The bumper absorber 92 is formed by a thin plate member, and has a curved portion 92A that is substantially U-shaped and protrudes-out toward the vehicle front side as seen in a vehicle side view. Namely, the vehicle rear side of the curved portion 92A is open as seen in a vehicle side view. In the present embodiment, the bumper absorber 92 is formed by a metal plate such as a thin iron plate or the like.

At the bumper absorber 92, an upper end portion 92C of the vehicle rear side of the curved portion 92A is joined by welding or the like to a top surface portion 20B of the front bumper reinforcement 20. A lower end portion 92D of the vehicle rear side of the curved portion 92A is joined by welding or the like to a bottom surface portion 20C of the front reinforcement 20.

A cut surface 92E, that is cut so as to be inclined toward the vehicle transverse direction outer side, from the vehicle front side toward the vehicle rear side, is formed at the outer side end surface of an end portion 92B in the vehicle transverse direction at the bumper absorber 92. A plate-shaped member 94 that is substantially planar is mounted by an adhesive to the cut surface 92E from the vehicle transverse direction outer side. The plate-shaped member 94 is disposed so as to cover the cut surface 92E of the bumper absorber 92 and the opening at the end portion 92B side of the bumper absorber 92. Namely, the outer shape portion at the vehicle front side of the plate-shaped member 94 as seen in a vehicle side view is made to be a shape that projects-out in a substantial U-shape in accordance with the shape of the cut surface 92E of the bumper absorber 92.

In the bumper structure 90 such as this, the plate-shaped member 94 is mounted by an adhesive to the cut surface 92E of the bumper absorber 92. When a collision body collides with a vehicle transverse direction inner side region that includes the end portion 92B in the vehicle transverse direction of the bumper absorber 92, the adhered portion of the plate-shaped member 94 and the cut surface 92E of the bumper absorber 92 is peeled due to the deformation of the bumper absorber 92, and the plate-shaped member 94 can be separated from the bumper absorber 92.

Figure 18:
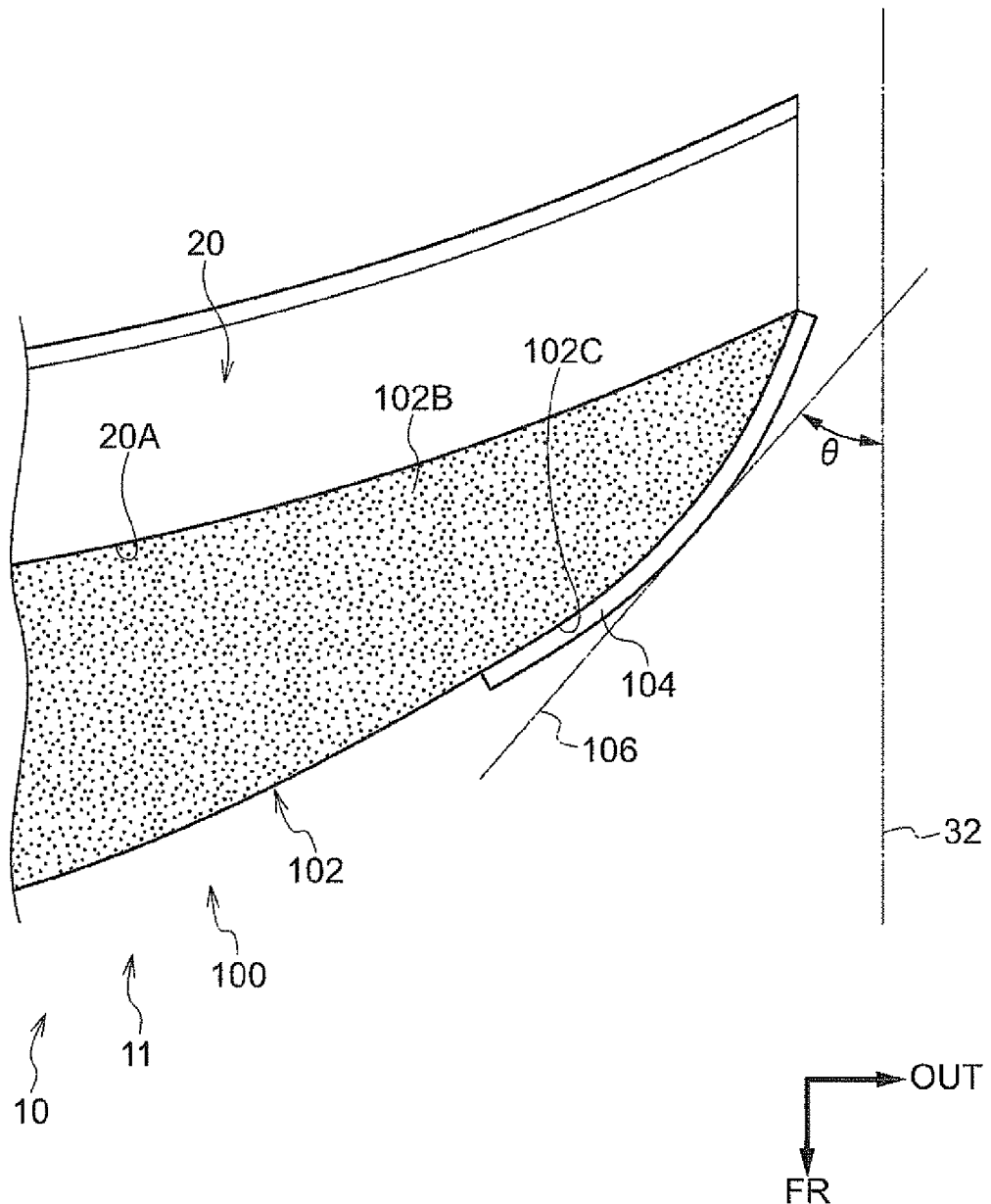
FIG. 18 is a plan view showing one side end portion in a vehicle transverse direction of a bumper structure relating to a sixth embodiment.

Next, a sixth embodiment of a bumper structure relating to the present invention is described by using FIG. 18. Note that structural portions that are the same as in the above-described first embodiment through fifth embodiment are denoted by the same numbers, and description thereof is omitted.

As shown in FIG. 18, a bumper structure 100 of the present embodiment has a bumper absorber 102 that is made of a foamed resin and serves as an example of an impact absorbing member that extends along the vehicle transverse direction. An outer side surface of an end portion 102B in the vehicle transverse direction at the bumper absorber 102 is made to be an inclined surface 102C that is inclined toward the vehicle transverse direction outer side, from the vehicle front side toward the vehicle rear side. The inclined surface 102C is not planar as in the first through third embodiments, and is a curved surface that projects-out toward the vehicle front side and the vehicle transverse direction outer side. A plate-shaped member 104, that is curved in a convex shape along the inclined surface 102C, is mounted by adhesion or the like to the inclined surface 102C.

Further, as seen in a vehicle plan view, the inclined surface 102C and the plate-shaped member 104 are disposed such that an angle θ of a tangent line 106 of the inclined surface 102C and the plate-shaped member 104 with respect to the imaginary line 32 that runs along the vehicle front-rear direction, satisfies $0°<θ≤60°$. Namely, if the inclined surface 102C and the plate-shaped member 104 can be formed so as to satisfy the angle θ such as this, there is no need for the inclined surface 102C and the plate-shaped member 104 to be flat.

In the bumper structure 100 such as this, when a collision body collides with the end portion 102B (the plate-shaped member 104) in the vehicle transverse direction of the bumper absorber 102, the collision body is prevented from hitting the bottom of the front bumper reinforcement 20 via the bumper absorber 102, and the impact can be mitigated.

Figure 19:
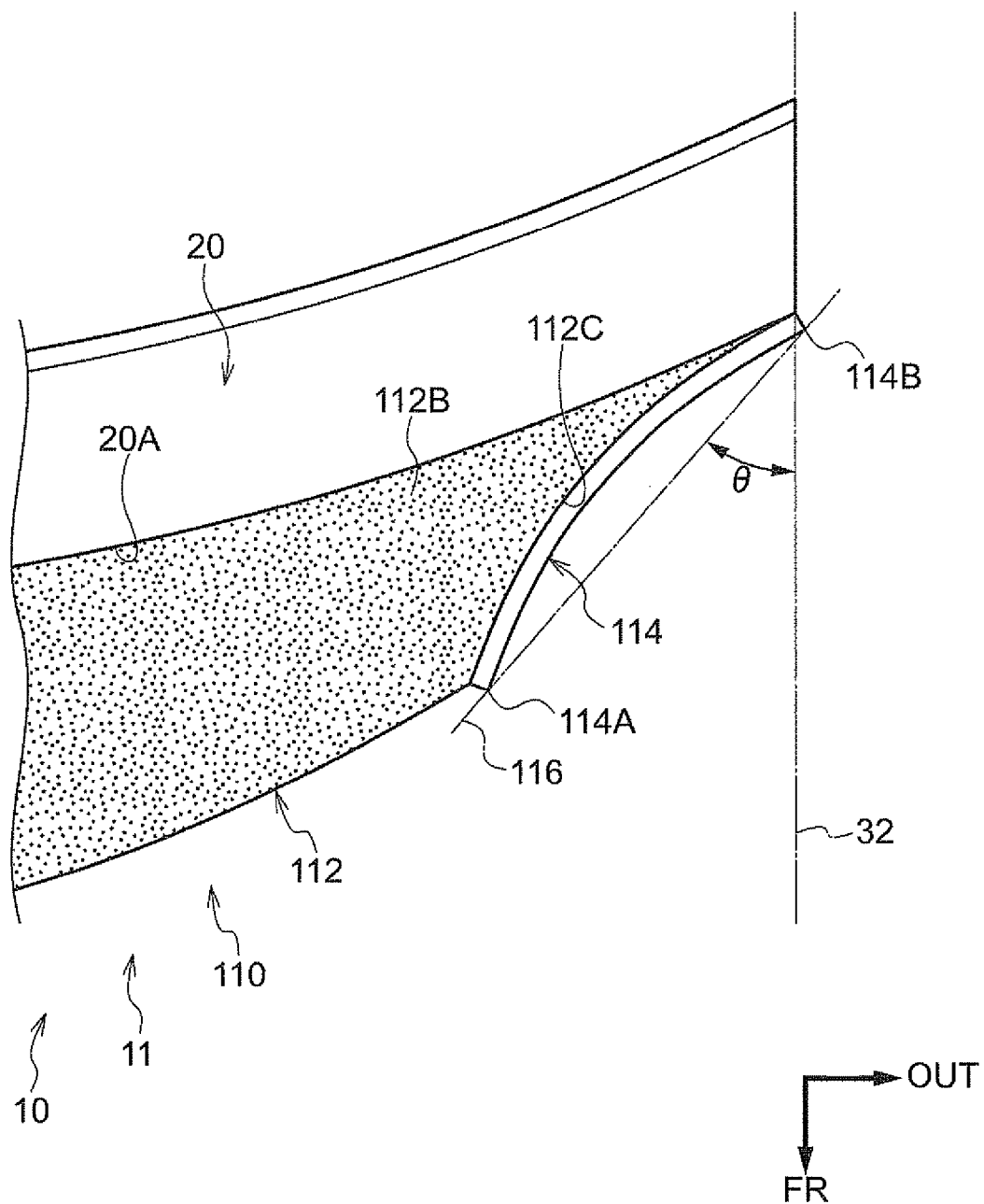
FIG. 19 is a plan view showing one side end portion in a vehicle transverse direction of a bumper structure relating to a seventh embodiment.

Next, a seventh embodiment of a bumper structure relating to the present invention is described by using FIG. 19. Note that structural portions that are the same as in the above-described first embodiment through sixth embodiment are denoted by the same numbers, and description thereof is omitted.

As shown in FIG. 19, a bumper structure 110 of the present embodiment has a bumper absorber 112 that is made of a foamed resin and serves as an example of an impact absorbing member that extends along the vehicle transverse direction. An outer side surface of an end portion 112B in the vehicle transverse direction at the bumper absorber 112 is made to be an inclined surface 112C that is inclined toward the vehicle transverse direction outer side, from the vehicle front side toward the vehicle rear side. The inclined surface 112C is not planar as in the first through third embodiments, and is a curved surface that is recessed-in toward the vehicle rear side and the vehicle transverse direction inner side. A plate-shaped member 114, that is curved in a concave shape along the inclined surface 112C, is mounted by adhesion or the like to the inclined surface 112C.

Further, as seen in a vehicle plan view, the inclined surface 112C and the plate-shaped member 114 are disposed such that an angle θ of a line 116, that connects a front side edge 114A and a rear side edge 114B of the plate-shaped member 114, with respect to the imaginary line 32 that runs along the vehicle front-rear direction, satisfies $0°<θ≤60°$. Namely, if the inclined surface 112C and the plate-shaped member 114 can be formed so as to satisfy the angle θ such as this, there is no need for the inclined surface 112C and the plate-shaped member 114 to be flat.

In the bumper structure 110 such as this, when a collision body collides with the end portion 112B (the plate-shaped member 114) in the vehicle transverse direction of the bumper absorber 112, the collision body is prevented from hitting the bottom of the front bumper reinforcement 20 via the bumper absorber 112, and the impact can be mitigated.

Figure 20:
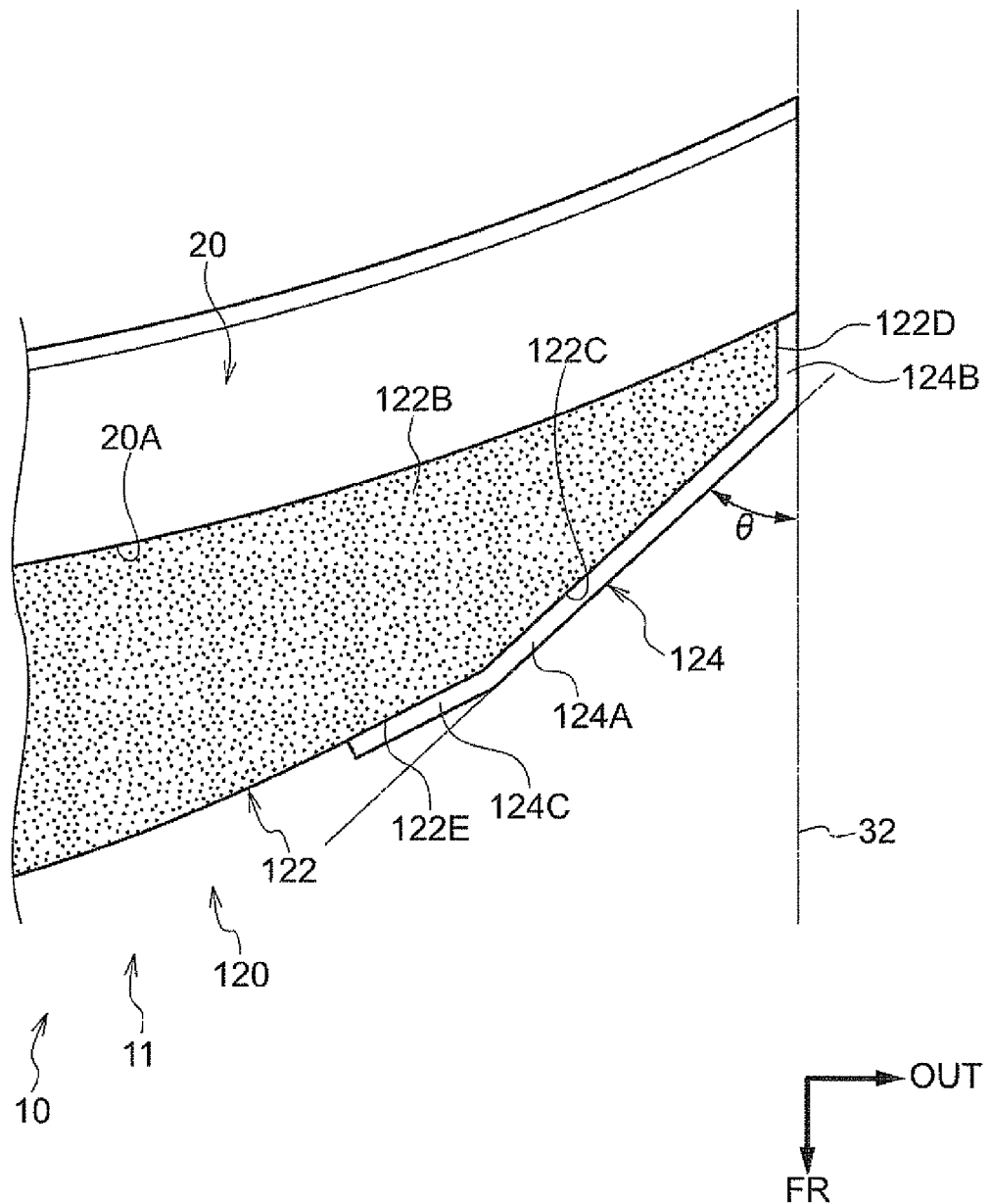
FIG. 20 is a plan view showing one side end portion in a vehicle transverse direction of a bumper structure relating to an eighth embodiment.

Next, an eighth embodiment of a bumper structure relating to the present invention is described by using FIG. 20. Note that structural portions that are the same as in the above-described first embodiment through seventh embodiment are denoted by the same numbers, and description thereof is omitted.

As shown in FIG. 20, a bumper structure 120 of the present embodiment has a bumper absorber 122 that is made of a foamed resin and serves as an example of an impact absorbing member that extends along the vehicle transverse direction. The outer side surface of an end portion 122B in the vehicle transverse direction at the bumper absorber 122 is made to be an inclined surface 122C that is planar and that is inclined toward the vehicle transverse direction outer side, from the vehicle front side toward the vehicle rear side. Further, the bumper absorber 122 has a rear wall portion 122D that extends toward the vehicle rear side from the vehicle transverse direction outer side end portion of the inclined surface 122C. A plate-shaped member 124 has a vertical wall portion 124A that is disposed in a state of planarly-contacting the inclined surface 122C of the bumper absorber 122, an outer side bent portion 124B that is bent along the rear wall portion 122D of the bumper absorber 122 from the vehicle transverse direction outer side end portion of the vertical wall portion 124A, and an inner side bent portion 124C that is bent along a front surface portion 122E of the bumper absorber 122 from the vehicle transverse direction inner side end portion of the vertical wall portion 124A. The plate-shaped member 124 is mounted to the inclined surface 122C and the rear wall portion 122D and the front surface portion 122E of the bumper absorber 122 by adhesion or the like.

Further, as seen in a vehicle plan view, the inclined surface 122C and the vertical wall portion 124A of the plate-shaped member 124 are disposed such that an angle θ of the vertical wall portion 124A with respect to the imaginary line 32 that runs along the vehicle front-rear direction, satisfies 0°<θ≤60°. Namely, if the inclined surface 122C and the vertical wall portion 124A of the plate-shaped member 124 can be formed so as to satisfy the angle θ such as this, there may be a structure that has the rear wall portion 122D and the outer side bent portion 124B at the vehicle transverse direction outer side of the inclined surface 122C and the vertical wall portion 124A.

In the bumper structure 120 such as this, when a collision body collides with the end portion 122B (the plate-shaped member 124) in the vehicle transverse direction of the bumper absorber 122, the collision body is prevented from hitting the bottom of the front bumper reinforcement 20 via the bumper absorber 122, and the impact can be mitigated.

Figure 21:
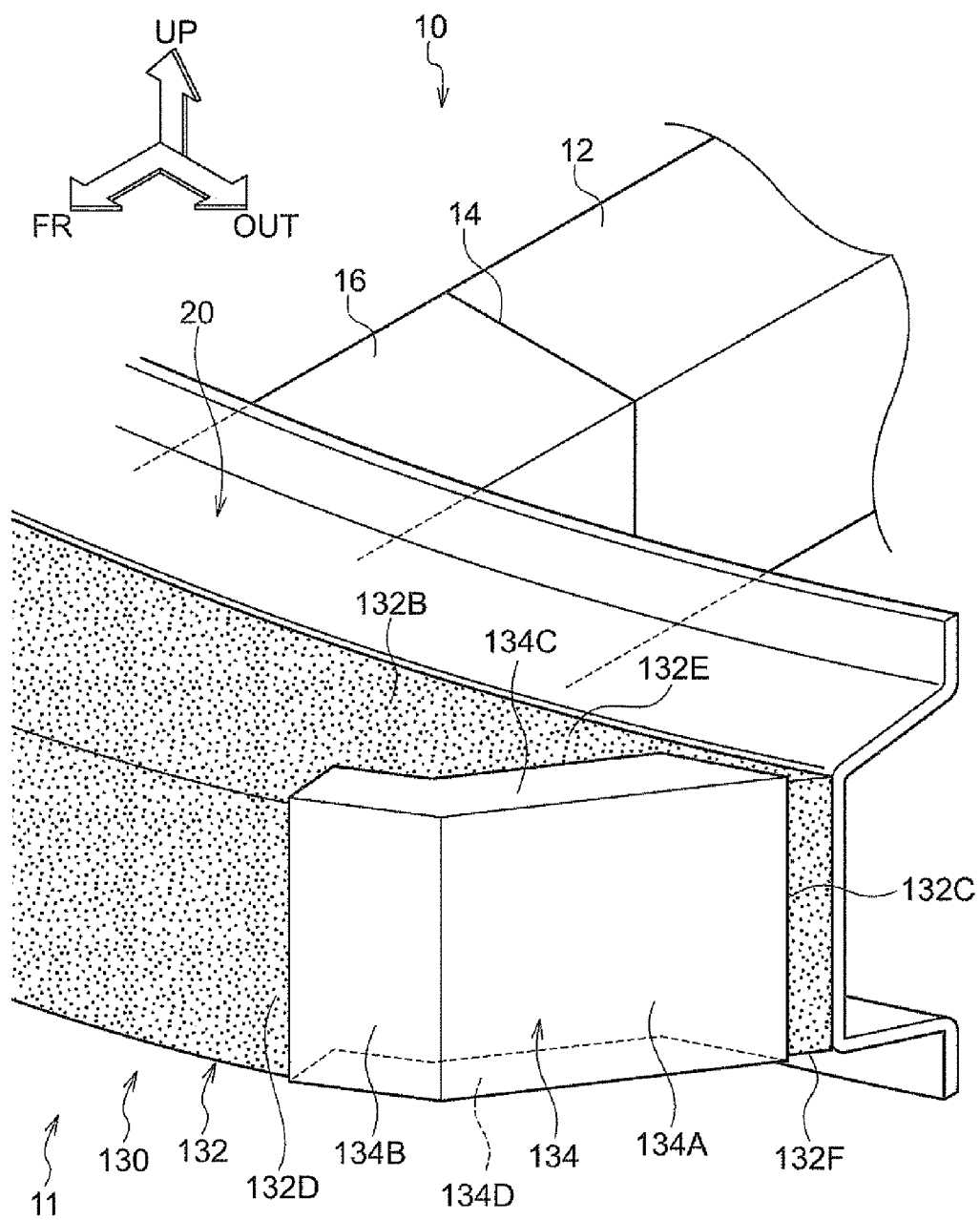
FIG. 21 is a perspective view showing one side end portion in a vehicle transverse direction of a bumper structure relating to a ninth embodiment.

Next, a ninth embodiment of a bumper structure relating to the present invention is described by using FIG. 21. Note that structural portions that are the same as in the above-described first embodiment through eighth embodiment are denoted by the same numbers, and description thereof is omitted.

As shown in FIG. 21, a bumper structure 130 of the present embodiment has a bumper absorber 132 that is made of a foamed resin and serves as an example of an impact absorbing member that extends along the vehicle transverse direction. The outer side surface of an end portion 132B in the vehicle transverse direction at the bumper absorber 132 is made to be an inclined surface 132C that is planar and that is inclined toward the vehicle transverse direction outer side, from the vehicle front side toward the vehicle rear side. A plate-shaped member 134 is formed from a metal plate, and has a vertical wall portion 134A that is disposed in a state of planarly-contacting the inclined surface 132C, and has, at the vehicle transverse direction inner side of the vertical wall portion 134A, a bent portion 134B that is bent so as to wrap-around toward a front surface 132D that is at the vehicle transverse direction inner side of the inclined surface 132C of the bumper absorber 132. Moreover, the plate-shaped member 134 has a flange portion 134C that is bent from the upper ends of the vertical wall portion 134A and the bent portion 134B so as to contact a top surface 132E of the bumper absorber 132, and a flange portion 134D that is bent from the lower ends of the vertical wall portion 134A and the bent portion 134B so as to contact a bottom surface 132F of the bumper absorber 132. The plate-shaped member 134 is mounted by adhesion or the like at least to the inclined surface 132C and the front surface 132D of the bumper absorber 132.

In the bumper structure 130 such as this, the rigidity of the plate-shaped member 134 can be ensured by providing the flange portions 134C, 134D, that are bent toward the vehicle rear side, at the upper end and the lower end of the plate-shaped member 134.

Note that, in the present embodiment, the flange portions 134C, 134D are provided at the upper end and the lower end of the plate-shaped member 134, but a flange portion may be provided at either one of the upper end and the lower end of the plate-shaped member 134.

Figure 22:
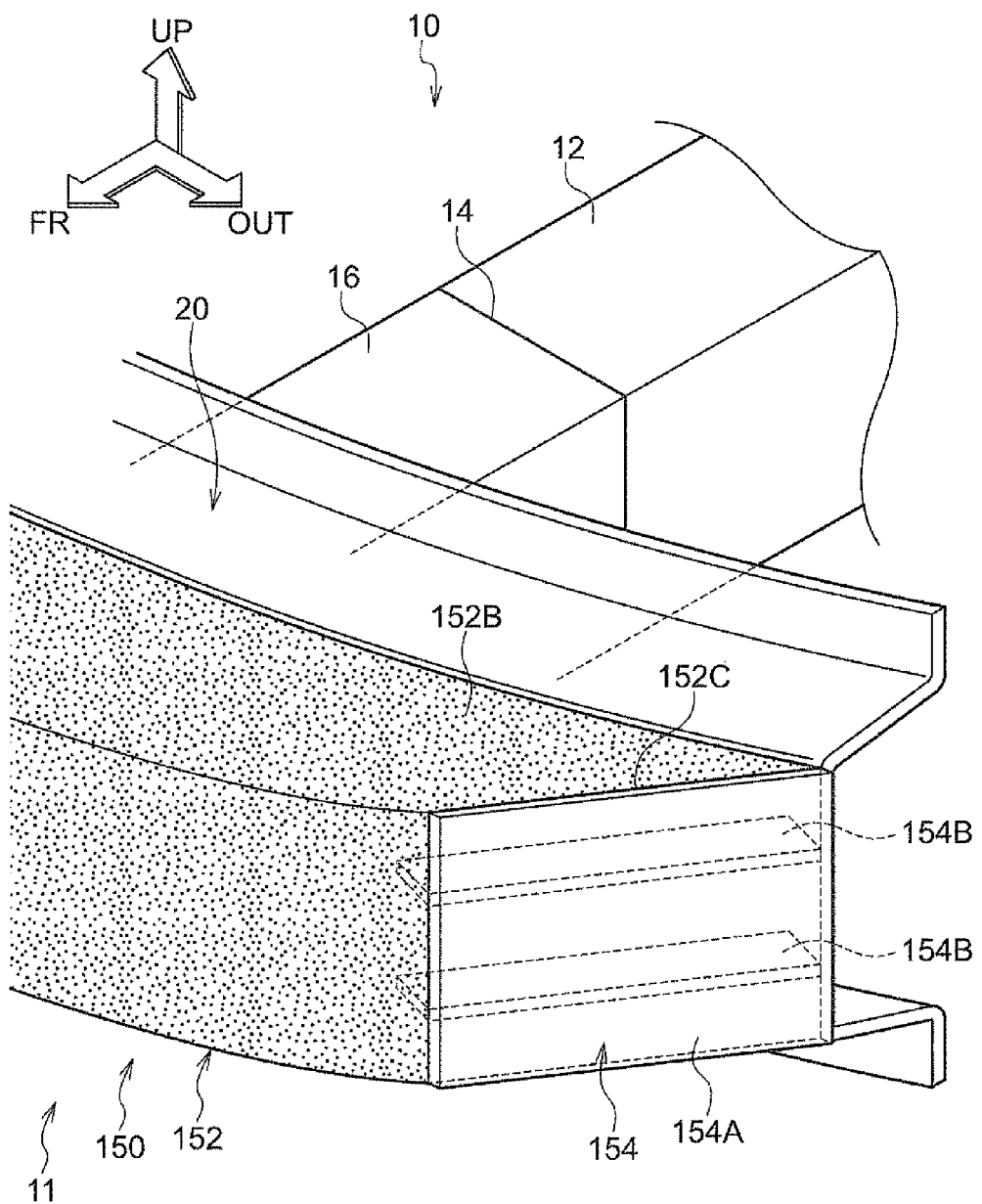
FIG. 22 is a perspective view showing one side end portion in a vehicle transverse direction of a bumper structure relating to a tenth embodiment.
Figure 23:
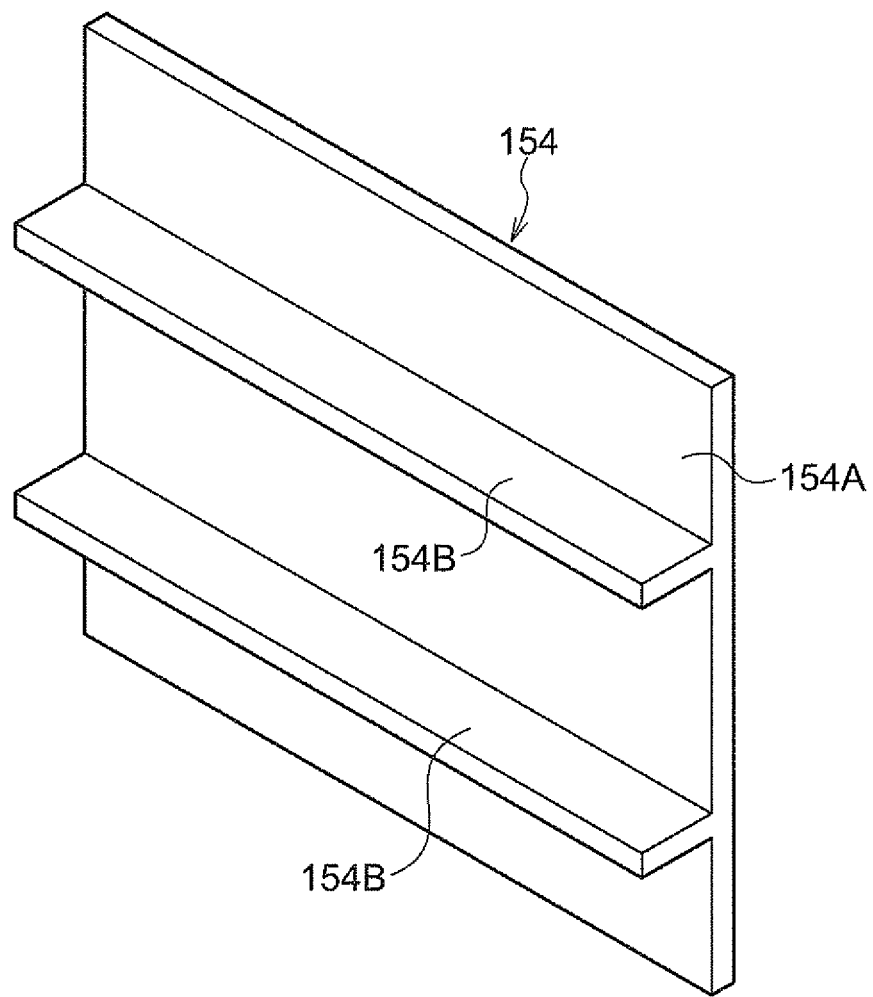
FIG. 23 is a perspective view showing a plate-shaped member that is used in the bumper structure relating to the tenth embodiment.
Figure 24:
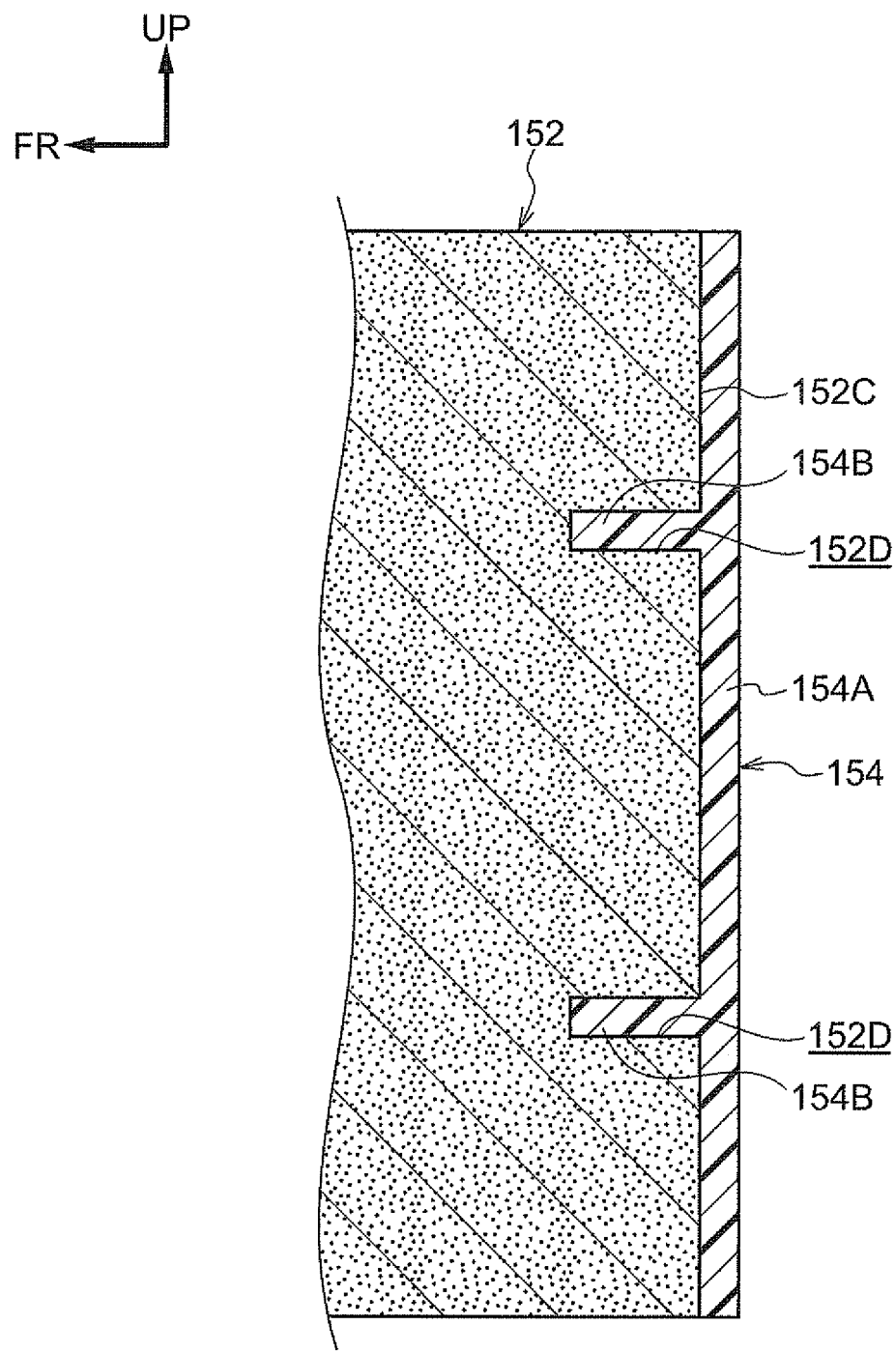
FIG. 24 is a vertical sectional view showing a vicinity of the plate-shaped member of the bumper structure relating to the tenth embodiment.

Next, a tenth embodiment of a bumper structure relating to the present invention is described by using FIG. 22 through FIG. 24. Note that structural portions that are the same as in the above-described first embodiment through ninth embodiment are denoted by the same numbers, and description thereof is omitted.

As shown in FIG. 22 through FIG. 24, a bumper structure 150 of the present embodiment has a bumper absorber 152 that is made of a foamed resin and serves as an example of an impact absorbing member that extends along the vehicle transverse direction. The outer side surface of an end portion 152B in the vehicle transverse direction at the bumper absorber 152 is made to be an inclined surface 152C that is inclined toward the vehicle transverse direction outer side, from the vehicle front side toward the vehicle rear side. A plate-shaped member 154 is mounted to the inclined surface 152C of the bumper absorber 152. The plate-shaped member 154 has a vertical wall portion 154A that is disposed in a state of planarly-contacting the inclined surface 152C, and two ribs 154B that project-out from the rear surface of the vertical wall portion 154A toward the vehicle rear side. The two ribs 154B are disposed along the vehicle transverse direction with a predetermined interval therebetween in the vehicle vertical direction. The plate-shaped member 154 is formed of a resin that is harder than the bumper absorber 152, and the rigidity thereof is ensured by the two ribs 154B. The vertical wall portion 154A and the ribs 154B are molded integrally of a resin.

The plate-shaped member 154 is mounted by the ribs 154B being inserted into two holes 152D that are formed in the inclined surface 152C of the bumper absorber 152. Note that the vertical wall portion 154A of the plate-shaped member 154A and the inclined surface 152C of the bumper absorber 152 are adhered by an adhesive.

In the bumper structure 130 such as this, when the plate-shaped member 154 is formed of a resin that is harder than the bumper absorber 152, the rigidity of the plate-shaped member 154 can be ensured by providing the ribs 154B. Further, by inserting the ribs 154B into the two holes 152D that are formed in the inclined surface 152C of the bumper absorber 152, the mounting of the plate-shaped member 154 to the inclined surface 152C of the bumper absorber 152 is easy.

Note that the above-described first through tenth embodiments are bumper structures at the front side that are provided at the front portion 11 of the vehicle 10, but are not limited to this, and the present invention can be applied also to a bumper structure at the rear side that is provided at the rear portion of the vehicle 10. When the present invention is applied to a bumper structure at the rear side, it is disposed such that the vehicle front and rear are opposite the bumper structure of the front side (such that the vehicle front and rear are symmetrical as seen in a vehicle side view). Namely, although illustration is omitted, in a bumper absorber that is used in a bumper structure at the rear side, the outer side surface of the vehicle transverse direction end portion is made to be an inclined surface that is inclined toward the vehicle transverse direction outer side, from the vehicle rear side toward the vehicle front side (from the vehicle front-rear direction outer side toward the vehicle front-rear direction inner side), and a plate-shaped member, whose rigidity is higher than the bumper absorber, is mounted to this inclined surface.

The invention claimed is:

1. A bumper structure comprising:
    a bumper reinforcement that extends along a vehicle transverse direction at an end portion in a vehicle front-rear direction;
    an impact absorbing member that is provided at a vehicle front-rear direction outer side of the bumper reinforcement, and at which an outer side surface of a vehicle transverse direction end portion is made to be an inclined surface that is inclined toward a vehicle transverse direction outer side from a vehicle front-rear direction outer side toward a vehicle front-rear direction inner side; and
    a plate-shaped member that is provided along the inclined surface at a vehicle transverse direction end portion of the impact absorbing member, having higher rigidity than the impact absorbing member,
    wherein the plate-shaped member can separate from the impact absorbing member in conjunction with deformation of the impact absorbing member due to input of an impact load to a vehicle transverse direction inner side region that includes the vehicle transverse direction end portion of the impact absorbing member, and
    wherein the plate-shaped member is adhered to at least the inclined surface of the impact absorbing member.

2. The bumper structure of claim 1, wherein a gap in the vehicle front-rear direction is provided between a vehicle transverse direction outer side end portion of the plate-shaped member and the bumper reinforcement.

3. The bumper structure of claim 1, wherein the plate-shaped member has a rib that projects out at the impact absorbing member side surface, and the plate-shaped member is mounted by the rib being inserted into the impact absorbing member.

4. A bumper structure comprising:
    a bumper reinforcement that extends along a vehicle transverse direction at an end portion in a vehicle front-rear direction;
    an impact absorbing member that is provided at a vehicle front-rear direction outer side of the bumper reinforcement, and at which an outer side surface of a vehicle transverse direction end portion is made to be an inclined surface that is inclined toward a vehicle transverse direction outer side from a vehicle front-rear direction outer side toward a vehicle front-rear direction inner side; and
    a plate-shaped member that is provided along the inclined surface at a vehicle transverse direction end portion of the impact absorbing member, having higher rigidity than the impact absorbing member,
    wherein the plate-shaped member can separate from the impact absorbing member in conjunction with deformation of the impact absorbing member due to input of an impact load to a vehicle transverse direction inner side region that includes the vehicle transverse direction end portion of the impact absorbing member, and
    wherein the plate-shaped member has an engaging portion that fixes the plate-shaped member to the inclined surface by being engaged with a portion to be engaged that is provided at the inclined surface.

5. The bumper structure of claim 4, wherein a gap in the vehicle front-rear direction is provided between a vehicle transverse direction outer side end portion of the plate-shaped member and the bumper reinforcement.

6. The bumper structure of claim 4, wherein the plate-shaped member has a rib that projects out at the impact absorbing member side surface, and the plate-shaped member is mounted by the rib being inserted into the impact absorbing member.

7. A bumper structure comprising:
    a bumper reinforcement that extends along a vehicle transverse direction at an end portion in a vehicle front-rear direction;
    an impact absorbing member that is provided at a vehicle front-rear direction outer side of the bumper reinforcement, and at which an outer side surface of a vehicle transverse direction end portion is made to be an inclined surface that is inclined toward a vehicle transverse direction outer side from a vehicle front-rear direction outer side toward a vehicle front-rear direction inner side; and
    a plate-shaped member that is provided along the inclined surface at a vehicle transverse direction end portion of the impact absorbing member, having higher rigidity than the impact absorbing member,
    wherein the plate-shaped member can separate from the impact absorbing member in conjunction with deformation of the impact absorbing member due to input of an impact load to a vehicle transverse direction inner side region that includes the vehicle transverse direction end portion of the impact absorbing member, and
    wherein the plate-shaped member is held at the inclined surface by a pair of claws that are provided at both vehicle transverse direction sides of the inclined surface at the impact absorbing member.

8. The bumper structure of claim 7, wherein a gap in the vehicle front-rear direction is provided between a vehicle transverse direction outer side end portion of the plate-shaped member and the bumper reinforcement.

9. A bumper structure comprising:
    a bumper reinforcement that extends along a vehicle transverse direction at an end portion in a vehicle front-rear direction;
    an impact absorbing member that is provided at a vehicle front-rear direction outer side of the bumper reinforcement, and at which an outer side surface of a vehicle transverse direction end portion is made to be an inclined surface that is inclined toward a vehicle transverse direction outer side from a vehicle front-rear direction outer side toward a vehicle front-rear direction inner side; and a plate-shaped member that is provided along the inclined surface at a vehicle transverse direction end portion of the impact absorbing member, having higher rigidity than the impact absorbing member,
wherein the plate-shaped member can separate from the impact absorbing member in conjunction with deformation of the impact absorbing member due to input of an impact load to a vehicle transverse direction inner side region that includes the vehicle transverse direction end portion of the impact absorbing member, and
wherein the plate-shaped member is joined, by integral molding or welding, to at least the inclined surface of the impact absorbing member.

10. The bumper structure of claim 9, wherein a gap in the vehicle front-rear direction is provided between a vehicle transverse direction outer side end portion of the plate-shaped member and the bumper reinforcement.

11. The bumper structure of claim 9, wherein the plate-shaped member has a rib that projects out at the impact absorbing member side surface, and the plate-shaped member is mounted by the rib being inserted into the impact absorbing member.

* * * * *